United States Patent
Ling et al.

(10) Patent No.: US 8,719,913 B2
(45) Date of Patent: May 6, 2014

(54) REDUNDANCY DETECTION AND RESOLUTION AND PARTIAL ORDER DEPENDENCY QUANTIFICATION IN ACCESS CONTROL LISTS

(75) Inventors: Yibei Ling, Belle Mead, NJ (US); Aditya Naidu, Edison, NJ (US); Rajesh Talpade, Madison, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 321 days.

(21) Appl. No.: 12/634,984

(22) Filed: Dec. 10, 2009

(65) Prior Publication Data

US 2010/0199344 A1     Aug. 5, 2010

Related U.S. Application Data

(60) Provisional application No. 61/149,101, filed on Feb. 2, 2009.

(51) Int. Cl.
*H04L 29/06* (2006.01)
*G06F 17/00* (2006.01)
*G06F 9/00* (2006.01)
*G06F 15/16* (2006.01)
*G06F 7/04* (2006.01)

(52) U.S. Cl.
USPC ............... 726/11; 726/1; 709/223; 709/229

(58) Field of Classification Search
None
See application file for complete search history.

(56) References Cited

U.S. PATENT DOCUMENTS

| | | | | |
|---|---|---|---|---|
| 6,651,096 B1 * | 11/2003 | Gai et al. | ...................... | 709/223 |
| 7,007,032 B1 * | 2/2006 | Chen et al. | .................... | 707/693 |
| 7,516,475 B1 * | 4/2009 | Chen et al. | ......................... | 726/1 |
| 7,680,822 B1 * | 3/2010 | Vyas et al. | .................... | 707/781 |
| 7,983,264 B2 * | 7/2011 | Etheridge | ..................... | 370/392 |
| 2004/0260818 A1 * | 12/2004 | Valois et al. | .................. | 709/229 |

* cited by examiner

*Primary Examiner* — Shin-Hon Chen
(74) *Attorney, Agent, or Firm* — Heslin Rothenberg Farley & Mesiti P.C.

(57) ABSTRACT

Aspects of the invention pertain to analyzing and modifying access control lists that are used in computer networks. Access control lists may have many individual entries that indicate whether information can be passed between certain devices in a computer network. The access control lists may include redundant or conflicting entries. An aspect of the invention converts an order-dependent control list into an order-free equivalent. Redundant entries are identified and removed without adversely affecting the access control list. Redundancy may be identified by evaluating the volume contraction ratio, which is the ratio of the volume of spin-off entries to specific original entry in the access control list. This ratio reflects the extent of order-dependent impact on that entry in a given access control list.

15 Claims, 24 Drawing Sheets

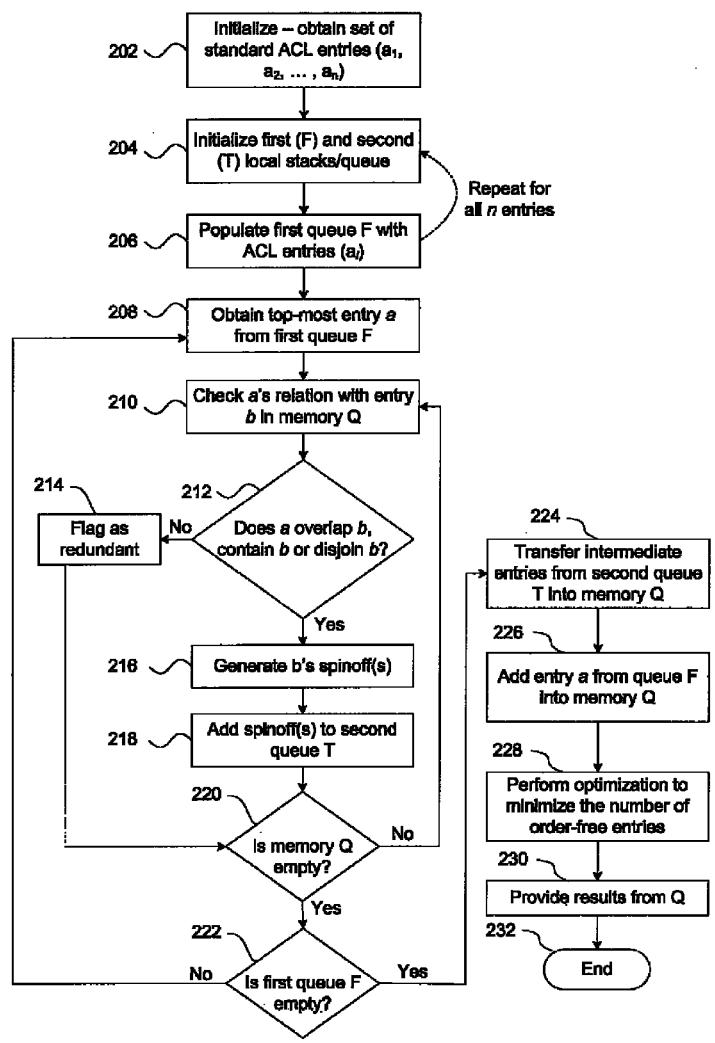

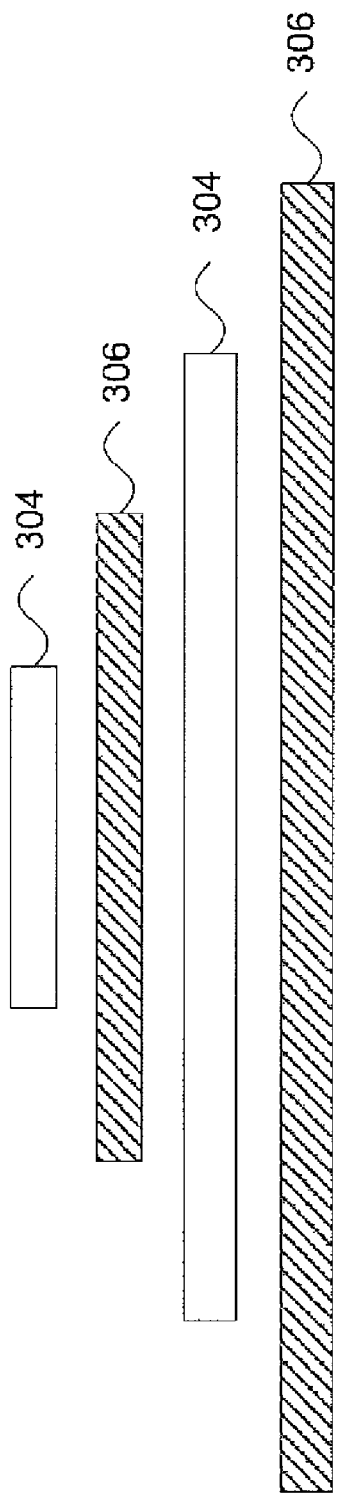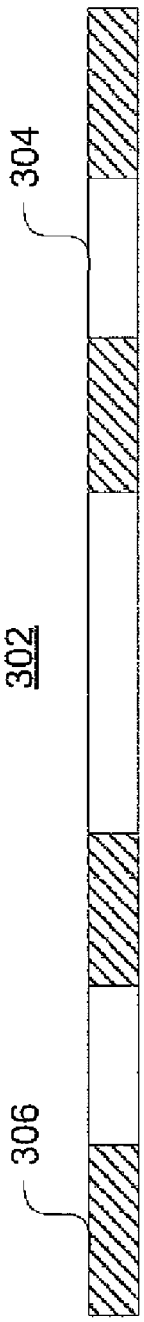

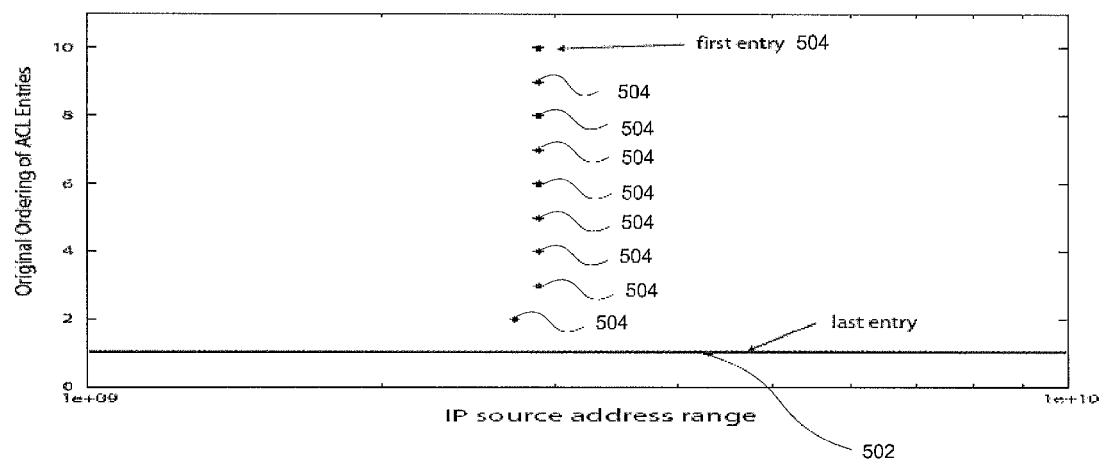

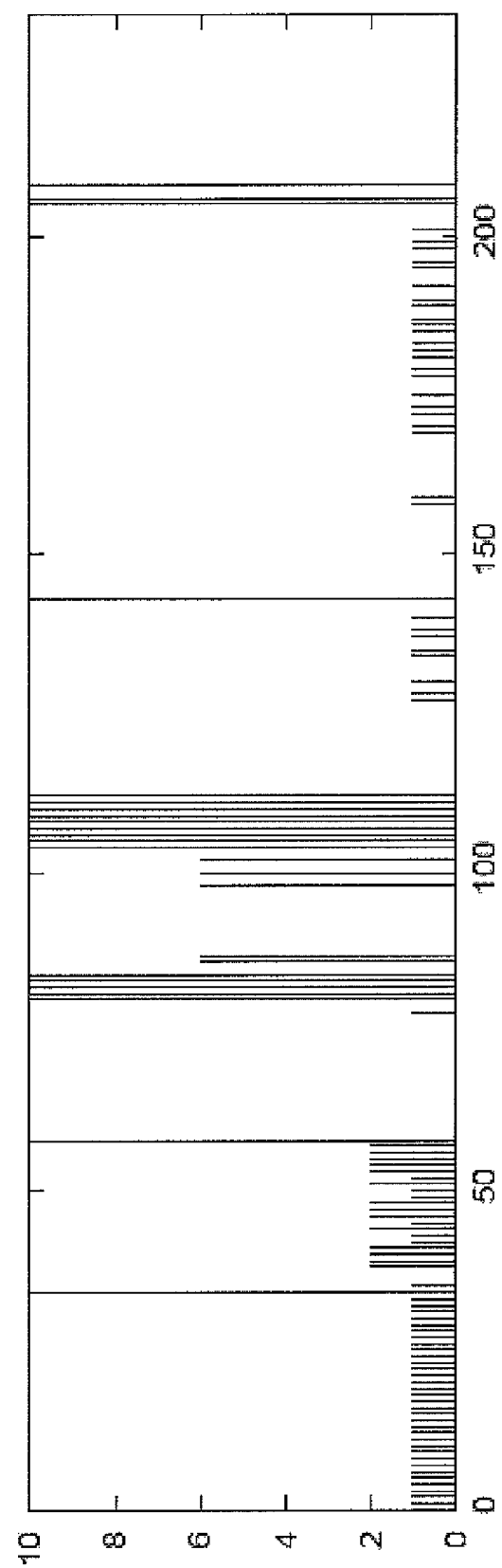

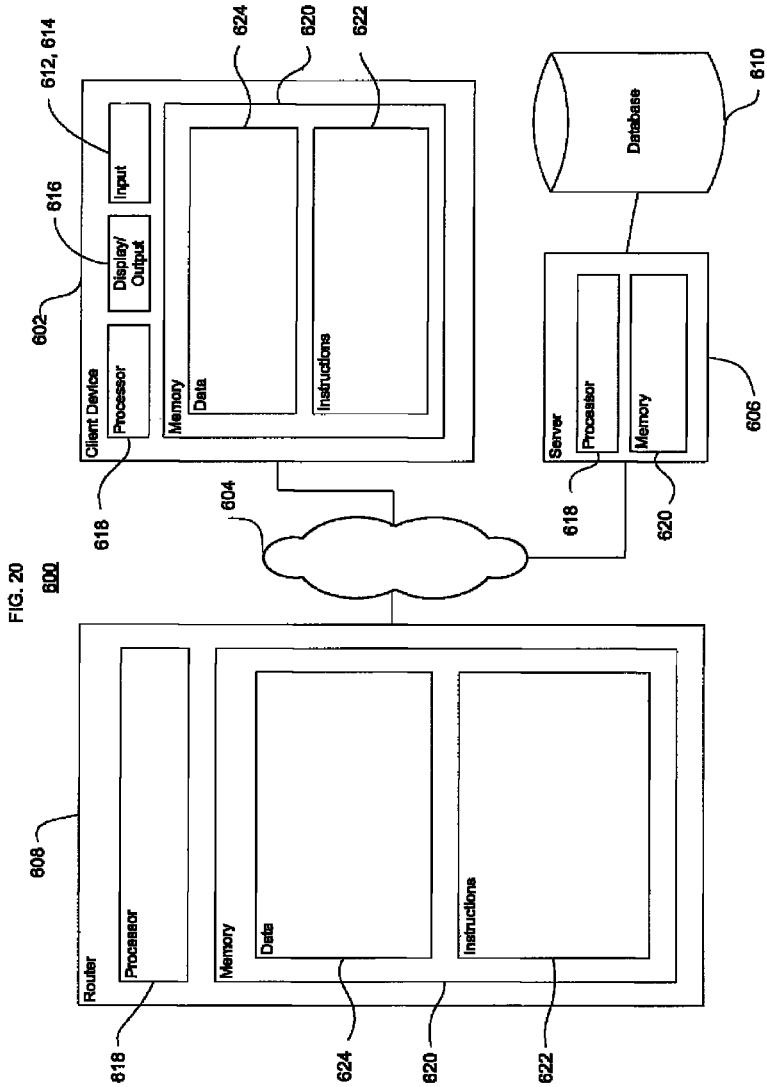

REDUNDANCY DETECTION AND RESOLUTION AND PARTIAL ORDER DEPENDENCY QUANTIFICATION IN ACCESS CONTROL LISTS

CROSS-REFERENCE TO RELATED APPLICATION

The instant application claims the benefit of U.S. Provisional Patent Application No. 61/149,101, entitled "System and Method for Determining Semantic Equivalence Between Access Control Lists (ACL)," filed Feb. 2, 2009, the entire disclosure of which is hereby expressly incorporated by reference herein.

BACKGROUND OF THE INVENTION

1. Field of the Invention

The invention generally relates to security and traffic management in enterprise networks. More particularly, aspects of the invention are directed to managing access control lists and traffic flow in computer networks.

2. Description of Related Art

An Access Control List ("ACL") is a rule-based packet classifier. It plays an essential role in network devices for supporting various services such as firewalls, Virtual Private Networks ("VPNs") and Quality of Service ("QoS"). ACLs are de facto order-dependent and multi-dimensional. Such properties have many adverse effects. For instance, conflicts may arise that impede security compliance analysis. And these properties make ACLs highly sensitive to change.

ACLs are one of the most important security features in managing access control policies in large scale enterprise networks. An ACL contains a list of entries that define matching criteria inside packet header. Based on first matching rule criteria, each ACL is typically assumed to be a linear list of entries being executed from top down. In conventional operation, the action corresponding to the first entry that matches the condition takes effect. If no match is found, the router then drops the packet (implicit deny). When there are two or more entries matching a given criterion, based on first matching rule, the permit or deny classification of the first matching entry takes effect, whereas subsequent entries become irrelevant (redundant).

The presence of no-effect entries further muddles the ability to comprehend the true semantic meaning of long ACLs, making ACL maintenance extremely difficult. Constant improvement in hardware/software capacity allows routers to handle more traffic flows, giving rise to an increased ACL size. In addition, a fine-granular control for traffic demands for an increased expressiveness of ACL language. This, in turn, further complicates the ability to comprehend the meaning of an ACL in total scope.

FIG. 1 illustrates a computer network 10 including a user computer 12 connected to a network router 14 via the Internet 16. A firewall 18 filters data packets send to or from computers coupled to the router 14. A first set of computers 20a and 20b behind the firewall 18 may be accessed via a first interface 22. And a second set of computers 24a, 24b and 24c may be accessed via a second interface 26.

Depending on ACL information maintained by the firewall 18, traffic flow may be permitted or denied. As shown, traffic may be permitted between the user computer 12 and the computer 24c coupled to second interface 26 as shown by arrow 28. In contrast, traffic from the user computer 12 to the computer 20a may be blocked by the firewall 18, as shown by the dashed arrow 30.

Resembling an if-then statement in the C programming language, the generic syntax of an ACL entry is typically expressed in the form of the if condition then action. The condition may specify source, destination IP address range, protocol and port ranges. The action is binary, either permit or deny. While seemingly straightforward, in practice ACLs can be long, complex and error-prone. Furthermore, there may be hundreds or thousands of ACL entries of ACL entries implemented by multiple routers in a given network.

The complexity of ACLs is reflected in the growing demand for fine granular control of network traffic in the context of network security management and QoS requirements. Due to the order dependency, the intended meaning of every individual ACL entry can be altered or erased with removal of existing entries or addition of new entries. Such an excessive sensitivity to semantics of an ACL due to changes makes it extremely hard to comprehend the meaning of the ACL in total scope.

One area of particular interest is priority-based ACL implementations. In such implementations, each entry in a priority-based ACL will be assigned a priority. The priority value will be used to break a tie if a conflict among entries occurs. Namely, among entries that match an incoming packet, the entry with the highest priority takes effect. A priority-based ACL is a generalization of a commonly-used ACL. It is flexible and adaptive in handling various QoS and security requirements.

Due to the practical significance in a large-scale network security management, the impact of ACLs has been an extensive research topic for many years. One type of method to address the ACL problem is to exploit fruitful theoretical results from the well-known Klee's measure problem. This is a computational geometry problem that is concerned with the efficiency of computing the measure of a union of multidimensional rectangular ranges. Klee provided an algorithm for computing the length of a union of intervals in one dimensional space and showed that time complexity of this algorithm is $O(n \log n)$.

It was subsequently shown by Fredman and Weide that $\Omega(n \log n)$ is optimal in the linear decision tree model. Bentley considered the natural extension to d-dimensional cases, and showed that $O(n \log n)$ is also optimal for two dimensions (i.e., d=2). For d>2, the complexity generalizes to an upper bound of $O(n^{d-1} \log n)$. Overmars & Yap exploited the notion of trellis rectangles and used a generalization of the k-d tree to partition the plane into a collection of trellises. They proved that the upper bound of time complexity for computing the Klee's measure of n rectangles in the d-dimensional space is $O(n^{d/2} \log n)$.

Built on theoretical results from Overmars & Yap, Eppstein & Muthukrishnan proposed an algorithm based on the k-d tree for detecting conflicts in two-dimensional priority-based packet filters. A priority-based conflict refers to the presence of two filters with same priority level and different actions on the same packet. The computational complexity of the Eppstein & Muthukrishnan algorithm for determining whether a rule set contains any conflicts is $O(n^{3/2})$ where n is the size of rule set. This, however, is restricted to two dimensional packet classification and filter conflict detection problems.

Other work relates to routing performance in handling traffic, focusing primarily on designing data structures that support efficient packet classification while minimizing computational resource utilization in dynamic and static environments. For instance, a scheme has been proposed that performs a binary search on a prefix-length structured hash table. Others have given a detailed review of data structures for one-dimensional packet classification in routing tables, focused on longest-prefix matching and most-specific range matching tie breaker data structures.

A refined tie-breaker data structure has been proposed to support two-dimensional packet classification. A memory-efficient B-tree for one-dimensional packet classification has also been proposed. A variant of red-black tree data structures has been proposed for supporting three operations of longest-matching prefix-tables in O(n) where n is the number of (one-dimensional) entries (rules). Another approach only detects conflicts in ACL entries using a framework limited to two dimensional space.

Due to the dimension-induced complexity in ACLs, such approaches are rudimentary solutions and are often ineffective in addressing fundamental issues in ACLs.

SUMMARY OF THE INVENTION

Systems and methods which analyze and manage access control list information are provided. Aspects of the invention focus on partial redundancy qualification as well as redundancy detection and resolution.

In one embodiment, a method of handling redundant entries in an access control list usable in a computer network is provided. The method comprises obtaining an access control list and storing it in memory, the access control list including a plurality of entries; converting the plurality of entries from an order-dependent format into one or more order-free equivalents; storing the order-free equivalents in the memory; performing redundancy detection on the order-free equivalents to identify any redundant entries in the access control list; removing the redundant entries to create a modified access control list for use by a firewall of the computer network; and quantifying an extent of partial order dependence of each entry in the access control list.

In one alternative, performing redundancy detection includes: determining a volume of a given one of the plurality of entries in the access control list; identifying a spinoff corresponding to the given entry; determining a volume of a selected order-free equivalent corresponding to the spinoff; and updating the volume of the corresponding given entry in the access control list using the volume of the selected order-free equivalent. In this case, performing redundancy detection desirably includes determining a degree of alteration for each access control list entry. In one example, determining the degree of alteration includes determining whether the spinoff is equal to zero, and if so, identifying the given entry as identifying the given entry as redundant. And in another example, if the spinoff is not equal to zero, then updating the volume of the selected order-free equivalent corresponding to the spinoff.

In another alternative, performing redundancy detection includes determining a scope contraction ratio for each access control list entry.

In a further alternative, performing redundancy detection on the order-free equivalents to identify any redundant entries comprises determining whether a selected entry produces any spinoff entries after translation to a corresponding order-free equivalent; and if no spinoff entries are produced, removing the selected entry from the access control list to form the modified access control list.

In yet another alternative, the method further comprises the firewall executing the modified access control list to permit or deny access to network resources in accordance with the entries of the modified access control list.

In another embodiment, a computer-readable medium is provided. The medium has instructions stored thereon. The instructions, when executed by a processor, cause the processor to perform a method of handling redundant entries in an access control list usable in a computer network. The method comprises obtaining an access control list and storing it in memory, the access control list including a plurality of entries; converting the plurality of entries from an order-dependent format into one or more order-free equivalents; storing the order-free equivalents in the memory; performing redundancy detection on the order-free equivalents to identify any redundant entries in the access control list; removing the redundant entries to create a modified access control list for use by a firewall of the computer network; and quantifying an extent of partial order dependence of each entry in the access control list.

In one alternative, performing the redundancy detection includes determining a volume of a given one of the plurality of entries in the access control list; identifying a spinoff corresponding to the given entry; determining a volume of a selected order-free equivalent corresponding to the spinoff; and updating the volume of the corresponding given entry in the access control list using the volume of the selected order-free equivalent.

In a further embodiment, an apparatus is provided for handling redundant entries in an access control list usable in a computer network. The apparatus comprises memory for storing information regarding an access control list and a processor means. The access control list includes a plurality of entries. The processor means is configured for converting the plurality of entries from an order-dependent format into one or more order-free equivalents, storing the order-free equivalents in the memory, performing redundancy detection on the order-free equivalents to identify any redundant entries in the access control list, removing the redundant entries to create a modified access control list for use by a firewall of the computer network, and quantifying an extent of partial order dependence of each entry in the access control list.

In one alternative, the processor means performs the redundancy detection by determining a volume of a given one of the plurality of entries in the access control list, identifying a spinoff corresponding to the given entry, determining a volume of a selected order-free equivalent corresponding to the spinoff, and updating the volume of the corresponding given entry in the access control list using the volume of the selected order-free equivalent. In this case, the processor means may perform the redundancy detection by further determining a degree of alteration for each access control list entry. Optionally, the processor means determines the degree of alteration by determining whether the spinoff is equal to zero, and if so, identifying the given entry as entry as redundant. In another example, if the spinoff is not equal to zero, then the processing means updates the volume of the selected order-free equivalent corresponding to the spinoff.

In another alternative, the processor means performs the redundancy detection by further determining a scope contraction ratio for each access control list entry.

And in yet another alternative, the processor means performs the redundancy detection on the order-free equivalents to identify any redundant entries by determining whether a selected entry produces any spinoff entries after translation to a corresponding order-free equivalent; and if no spinoff entries are produced, removing the selected entry from the access control list to form the modified access control list.

BRIEF DESCRIPTION OF THE DRAWINGS

FIG. 3 illustrates a flow diagram showing a process for constructing order-free equivalent ACLs in accordance with aspects of the invention.

FIGS. 4(a)-(b) illustrate a one-dimensional scenario for order-dependant and order-free ACLs in accordance with aspects of the invention.

FIGS. 12(a)-(b) illustrate the scope of entries in an ACL in accordance with aspects of the present invention.

FIGS. 15(a)-(b) illustrate spinoff entry distributions in accordance with aspects of the invention.

FIG. 20 illustrates a computer network for use with aspects of the invention.

DETAILED DESCRIPTION

Figure 1:
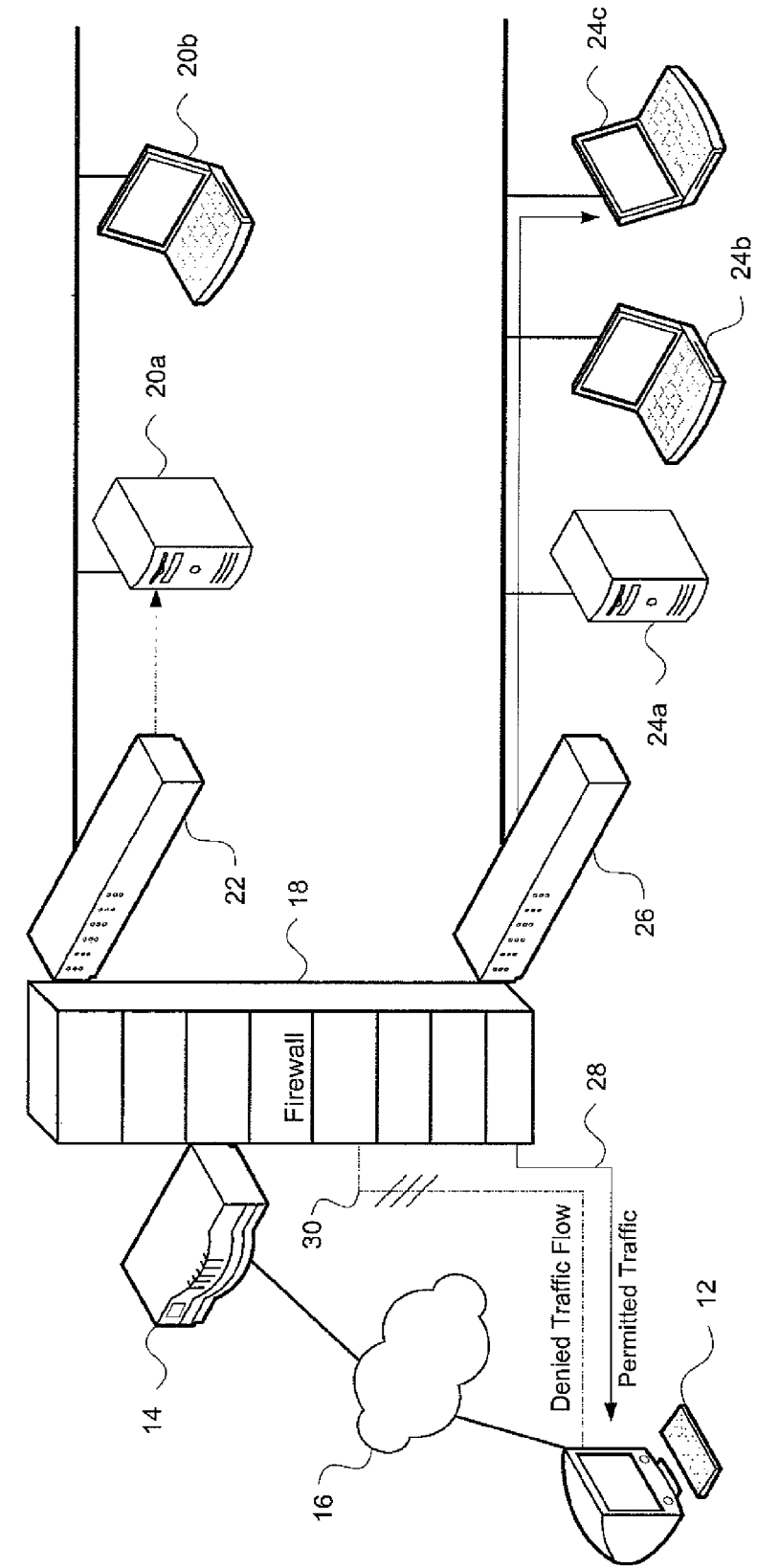
FIG. 1 illustrates a computer network employing a firewall.

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the scope of the invention is defined by the appended claims and equivalents.

One aspect of the invention identifies an order-free equivalent for an order-dependent ACL. As used herein, the term "ordering" is generic, and is applicable to both the first-matching rule in commonly-used ACLs as well as priority-based ACLs. A theoretical framework has been developed that allows one to construct an order-free equivalent by recursively gluing together the projected results on each involved dimension, thereby overcoming inherent dimension-induced difficulty in ACL problems. This framework lays a basis for solving some fundamental key problems in ACLs, including automatic detection/resolution of redundant entries in an ACLs, determining whether given ACLs are semantic equivalents, quantitative evaluation of the impact of order-dependency on each ACL entry in an ACL, and quantitative metrics for quantifying the partial redundancy of each rule in an ACL. In addition, the framework according to aspects of the invention can handle not only commonly-used ACLs (e.g., first-matching ACLs) but also priority-based ACLs.

In this section some related notions and definitions are introduced that will be used later on. The initial discussion focuses on standard ACLs (e.g., having a one dimensional range). While the focus in this section is on one dimensional range issues stemming from standard ACLs, it serves as an important step for understanding and handling the multidimensional problem in extended ACLs. The terms "order-independent" and "order-free" are used interchangeably herein. The terms "entry" and "rule" are also used interchangeably herein.

The notion of a "d-box" is first considered for simplified problem formulation. Definition 1: Let be $I_1, \ldots, I_d$ be the intervals in $1, \ldots, d^{th}$ dimensions. A d-box denoted by $B^d$, is defined as the Cartesian product of $I_1, \ldots, I_d$, denoted as $I_1 \otimes \ldots \otimes I_d$ or $[I_1, \ldots, I_d]$. Let $I_i(B^d) = I_i$ denote the ith interval interval of $B^d$.

A d-box is also referred to as a d-dimensional rectangle. It can be seen that a 1-box is an interval (range) in one-dimensional space, and a 2-box is a rectangle in two-dimensional space that is formed by the Cartesian product of two 1-boxes from two orthogonal dimensions. Standard ACL syntax is employed to see how to map an ACL entry into one-dimensional range. It includes an action (permit or deny) and other traffic-related information. Thus:

access-list list-number {permit|deny}{host|source wildcard|any}

A standard ACL allows one to permit or deny traffic from source IP addresses specified by a pair of source IP address and source wildcard. Note that the access list number of a standard ACL ranges from 1 to 99, and is unique for a given device/router. A mapping between ACL terminology and range dimension ordering is given in the table below. For instance, the source address range is defined as $I_1$, the source port is defined as $I_2$ etc.

TABLE

| ACL Terminology and Dimension Order | | | | | |
|---|---|---|---|---|---|
| source | | destination | | | |
| address | port | address | port | protocol | action |
| $I_1$ | $I_2$ | $I_3$ | $I_4$ | $I_5$ | S |
| $[a_L, a_R]$ | $[s_L, s_R]$ | $[d_L, d_R]$ | $[t_L, t_R]$ | $[p_L, p_R]$ | 1/0 |

A standard ACL entry can be formulated as $I_1 \alpha S$, where $I_1 = [a_L, a_R]$ is a closed interval denoting the source address range and S denotes a classification action on the source address range (S=1/0 denotes the classification permit/deny action). Here, $a_L = a_R$ means there is a single IP address.

A dotted decimal format IP address represented as d1.d2.d3.d4 can be uniquely converted to an integer form as $$\sum_{i=1}^{4} d_i 256^{4-i}$$

and vice versa. Let $a_i$ be a standard ACL entry written as $a_i = (I_1, S)_i$, where the subscript i denotes the ith entry in the original order in an ACL. Its source address range and traffic classification is denoted by $I(a_i)$ and $S(a_i)$. The intersection of $a_i$ and $a_j$ is defined as the one-dimensional range intersection $I_1(a_i) \cap I_1(a_j)$. Using the foregoing terminology, several important concepts are introduced as follows.

Definition 2: A standard ACL entry is said to be order independent if and only if ("iff") the intersection of any two of its entries $a_i$, $a_j$, $i \ne j$ is empty, i.e., $I_1(a_i) \cap I_1(a_j)=0$. A standard ACL is said to be order dependent iff there is exists a non-empty intersection of ACL entries $a_i$, $a_j$, $i \ne j$, i.e., $I_1(a_i) \cap I_1(a_j) \ne 0$.

Definition 3: The interval difference of $I(a_i)$ and $I(a_j)$, denoted by $I(a_i) \ominus I(a_j)$, is an interval set such that an interval $x \subset I(a_i) \ominus I(a_j)$ means $x \cap I(a_i)=x$ and $x \cap I(a_j)=0$. The interval union of $I(a_i)$ and $I(a_j)$ is denoted by $I(a_i) \oplus I(a_j)$. For example, $[1,10] \ominus [4,8] = \{[1,3],[9,10]\}$, $[1,10] \ominus [4,15] = \{[1,3]\}$, and $[1,10] \oplus [14,15] = \{[1,10],[14,15]\}$.

Definition 4: Two standard ACLs A and B are said to be equivalent iff $A \subset B$ and $B \subset A$. According to definition 4, for any given traffic from an arbitrary source address range that is denied and permitted by A, it will also be denied and permitted by B, and vice versa.

Thus, an ACL with n entries may be viewed as an ordered n-tuple as $(a_1, a_2, \ldots, a_n)$, where $a_i$ refers to the ith entry in the original order. Let $a_j \pi a_i$ denote that $a_i$ precedes $a_j$ in this ordered n-tuple, i.e., $i<j$. Due to the order dependency in ACLs, if $a_j$ it $a_i$, then the scope of $a_j$ will be altered by $a_i$ when $I(a_i)$ and $I(a_j)$ intersect.

Figure 2:
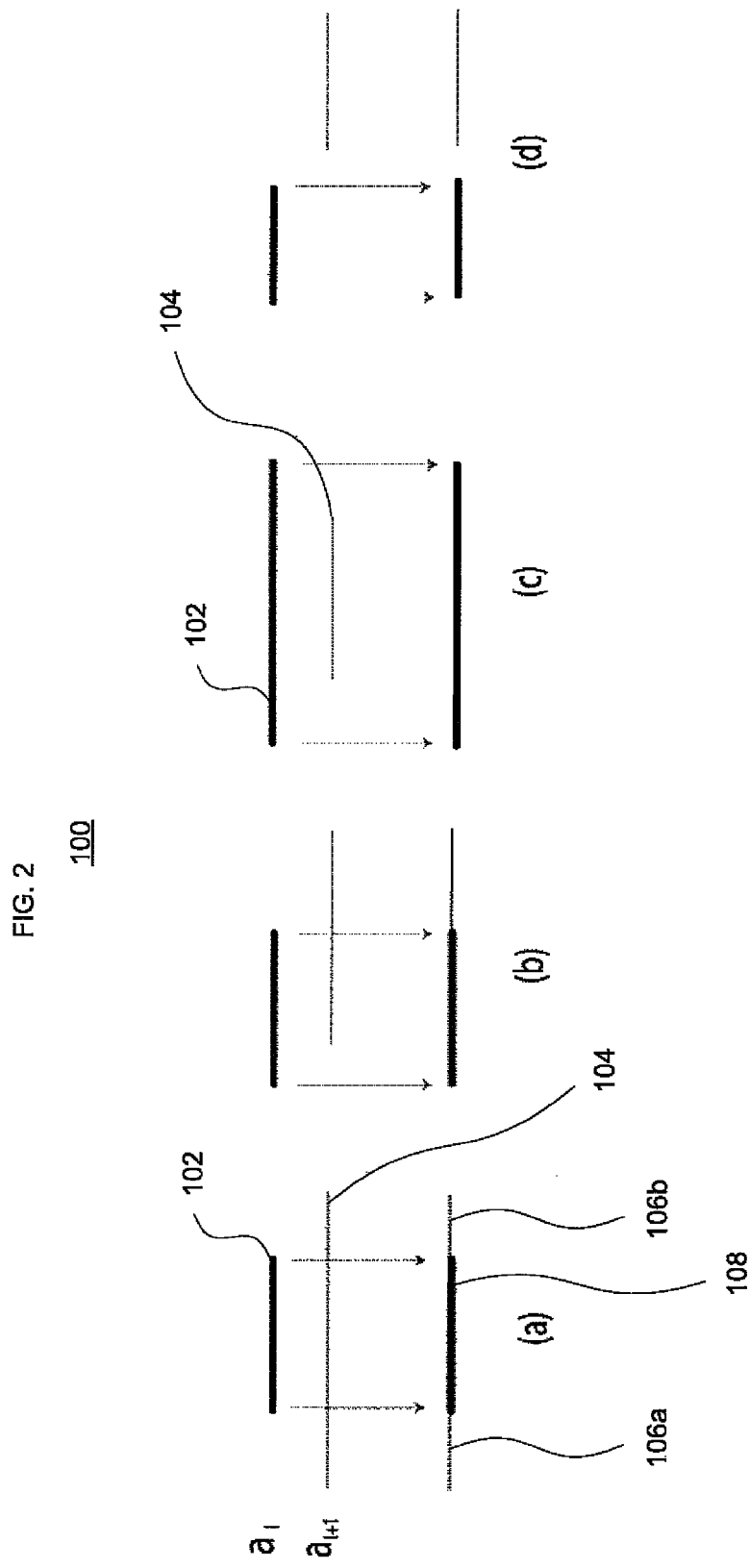
FIGS. 2(a)-(d) illustrate possible dependency situations in accordance with aspects of the invention.

FIGS. 2(a)-(d) show a four-fold intersection classification 100 of entry pair $a_i$ and $a_i+1$. FIG. 2(a) illustrates a "contain" scenario. FIG. 2(b) illustrates an "overlap" scenario. FIG. 2(c) illustrates an "enclose" scenario. And FIG. 2(d) illustrates a "disjoin" scenario. As shown, the interval presented by thick line 102 represents a deny interval of $a_i$. And the interval presented by the thin line 104 represents the permit interval of $a_i+1$. Due to the property of order dependency $(a_i+1 \pi a_i)$, the classification scope of $a_i$ is kept intact. Thus, how the scope of $a_i+1$ is affected depends on how the four-fold intersection classification with $a_i$. This is summarized as follows:

$$(I(a_i) \cap I(a_{i+1}) \ne I(a_{i+1})) \cap (I(a_i) \cap I(a_{i+1}) = I(a_i)) \quad (1)$$

$$(I(a_i) \cap I(a_{i+1}) = I(a_i)) \quad (2)$$

$$(I(a_i) \cap I(a_j) \ne \phi) \cap (I(a_i) \cap I(a_j) \ne (I(a_i)) \cap I(a_i) \ne I(a_j)) \quad (3)$$

$$(I(a_i) \cap I(a_{i+1}) = \phi) \quad (4)$$

The contain relation in FIG. 2(a) satisfies equation (1). Due to the property of order dependency, this relation breaks down the scope of $a_{i+1}$ into two disjoint subintervals being sandwiched by the interval of $a_i$. The overlap relation in FIG. 2(b) meets equation (3). This relation results in a scope contraction of $a_{i+1}$. The enclose relation in FIG. 2(c) satisfies equation (2), which makes $a_{i+1}$ irrelevant to the execution of the ACL. The disjoin relation in FIG. 2(d) satisfies equation (4). Under this condition, the scope of both $a_i$ and $a_{i+1}$ remains unaltered.

A similar analysis also can be applied to the case in which $S(a_i)=S(a_{i+1})$. For instance, the containment relation, as shown in FIG. 2(a), produces the two interval fragments 106a and 106b broken from the interval of $a_{i+1}$ plus one interval 108 from $a_i$. This observation suggests that the number of order-free entries may be reduced if two adjacent disjoint entries have the same classification status.

For easy algebraic manipulation, one may define $\cap(a_i,a_{i+1}) \equiv I(a_i) \cap I(a_{i+1})$. The relations between $a_i$ and $a_{i+1}$ $(a_{i+1} \pi a_i)$ in FIG. 2(a) is thus expressed in the union of two disjoint parts: 1) $I(a_i)$; 2) $I(a_{i+1}) \ominus \cap I(a_i,a_{i+1})$, which is equivalent to $I(a_{i+1}) \ominus \cap I(a_i)$. It can readily be seen that $I(a_i)$ and $I(a_{i+1}) \ominus \cap I(a_i,a_{i+1})$ are disjoint since $I(a_i) \cap (I(a_{i+1}) \ominus I(a_i))=0$.

The notion of a "spinoff interval" is defined as follows.
Definition 5: Let $(I_1,I_2)$ be an ordered pair of intervals, $V_1(I_1,I_2) \equiv I_2 \ominus \cap (I_1,I_2)$ be a spinoff interval set of $I'^2$, where the subscript refers to one-dimensional space. Let $|V_1(I_1,I_2)|$ be the number of spinoff intervals (1-boxes) from interval $I_2$. With the different range assignments of $a_i=(I,S)_i$ and $a_{i+1}=(I,S)_{i+1}$, the four-fold intersection classification of $a_i$ and $a_{i+1}$, along with the spinoff interval(s) $V_1(I(a_i),I(a_{i+1}))$ of $I(a_i+_i)$, is illustrated as below:

| Relation | $I(a_i)$ | $I(a_{i+1})$ | $V_1(I(a_i), I(a_{i+1}))$ |
| --- | --- | --- | --- |
| contain | [10, 15] | [5, 20] | [5, 9], [16, 20] |
| enclose | [5, 20] | [10, 15] | ∅ |
| disjoin | [5, 10] | [15, 20] | [15, 20] |
| overlap | [10, 15] | [12, 20] | [16, 20] |

Corollary 1. For any given pair of $a_i$ and $a_j$ with $a_j \pi a_i$, $V_1(I(a_i),I(a_j))$ is unique, and max $|(V_1 I(a_i),I(a_j)|=2$.

Spin-off entries of $a_{i+1}$ with respect to $a_i$ are defined as follows:

$$V_1(I(a_i),J(a_{i+1})),S(a_{i+1})) \equiv I,S(ai+1)|I \in V_1(I(a_i),J(a_{i+1})) \quad (5)$$

The notion of spinoff interval of an order pair of intervals can be extended immediately. Definition 6: Let $(I_1, \ldots, I_n)$ be an ordered n-tuple of intervals, then a spinoff interval set of $I_i$ with respect to the ordered n-tuple of intervals, denoted by $I_i(I_1 \ldots, I_i)$, is:

$$I'_i(I_1, \ldots, I_i) = \overbrace{(I_i \ominus I_1)}^{v_1} \ominus \ldots \ominus I_{i-1} \quad (6)$$

This equation can in turn be computed recursively as follows:

$$v_1=V_1(I_1,I_i), v_2=V_1(I_2,v_1), \ldots, v_{i-1}=V_1(I_{i-1},v_{i-2}) \quad (7)$$

where $2 \le i \le n$, $I'_i(I_1, \ldots, I_i)=v_{i-1}$.

It follows from equation (7) that a step-by-step computation is required to determine spinoff interval sets $I'_i$ with respect to an ordered n-tuple of intervals. Spin-off entries of $a_j$ may be further defined with respect to $a_1, \ldots, a_{j-1}$ as follows:

$$(I'_j(I(a_1), \ldots, I(a_{j-1}),I(a_j)),S(a_j)) \equiv (I,S(a_j)|I \in I'_j(I(a_1), \ldots, I(a_{j-1})),I(a_j)),I(a_j))) \quad (8)$$

An example of an ACL with five entries, together with spinoff entries, is given in the table below.

| ACL Entries |
| --- |
| $a_1 = ([1, 3], 0), a_2 = ([2, 8], 1), a_3 = ([5, 10], 0)$, |
| $a_4 = ([1, 10], 1), a_5 = ([20, 24], 0)$ |
| $I'(a_2) = v_1 = V_1(I(a_1), I(a_2)) = [4, 8]$ |
| $a_2' = I'(a_2), S(a_2)) = ([4, 8], 1), D(A, a_2) = 5/7$ |
| $v_1 = V_1(I(a_1), I(a_3)) = [5, 10]$, |
| $I'(a_3) = v_2 = V_1(I(a_2), v_1) = [9, 10]$ |
| $a_3' = (I'(a_3), S(a_3)) = ([9, 10], 0], D(A, a_3) = 1/3$ |
| $v_1 = V_1(I(a_1), I(a_4)) = [4, 10], v_2 = V_1(I(a_2), v_1) = [9, 10]$, |
| $I'(a_4) = v_3 = V_1(I(a_3), v_2) = \emptyset$ |
| $a_4' = \emptyset, D(A, a_4) = 0$ |
| $v_1 = V_1(I(a_1), I(a_5)) = [20, 24], v_2 = V_1(I(a_2), v_1) = [20, 24]$, |
| $v_3 = V_1(I(a_3), v_2) = [20, 24], I'(a_5) = V_1(I(a_4), v_3) = [20, 24]$ |
| $a_5' = ([20, 24], 0), D(A, a_5) = 1$ |

Thus, for a given $a_i$ in ACL A, it can be seen that its spinoff interval $I(a_i)$ is a subset of its original interval $I(a_i)$. The extent of scope contraction reflects the impact of order dependency (or partial redundancy) of $a_i$ on $a_1, \ldots, a_{i-1}$. Such a dependency impact is defined as follows.

Definition 7: Let $a_i$ be the ith entry in ACL A. The extent of order dependency of $a_i$ on $a_1, \ldots, a_{i-1}$, denoted by $D(A,a_i)$, is defined as the ratio of the $a_i$'s spinoff scope length to its original scope length. This is represented as:

$$\mathcal{D}(\mathcal{A}, a_i) = \frac{|I'_i(I(a_1), I(a_2), \ldots, I(a_i))|}{|I(a_i)|} \quad (9)$$

This equation is a measure of scope contraction of $a_i$ due to its order dependency on $a_1, \ldots, a_{i-1}$. $D(A,a_i)=1$ means that $a_i$ has no overlap with $a_1, \ldots, a_{i-1}$, and $D(A,a_i)=0$ indicates that the scope of $a_i$ is masked by $a_1, \ldots, a_{i-1}$, and thus $a_i$ is redundant. Between these two extreme scenarios, $D(A,a_i)$ lies between (0,1). In view of this, a definition of ACL redundancy may be expressed as follows.

Definition 8: Let $a_j$ be the kth entry in an ACL A. Then $a_k$ is said to be redundant iff $D(A,a_k)=0$. It should be noted that a d-box in the context of standard ACL is a one-dimensional interval, and in extended ACLs it is a 5-dimensional rectangle. This definition goes beyond the pairwise redundant scenario and reflects the most likely scenario that $a_k$ is redundant because it could be jointly masked by more than one $a_j(a_k \pi a_j)$. For example, $a_4$ in the "ACL Entries" table is jointly masked by a triple of $a_1, a_2, a_3$. This makes the ACL redundant detection and resolution issue both challenging and interesting.

Lemma 1. Let $a_i$ and $a_{i+1}$ be a pair of order dependent standard ACL entries. Then $a_i$, spinoff entries from $a_{i+1}$ ($V_1(I(a_i), I(a_{i+1}))$) are order-free and their union is equivalent to its order-dependent pair $(a_i, a_{i+1})$.

Thus, in accordance with one aspect of the invention, for an order-dependent standard ACL, there is a unique order-free equivalent ACL. This may be proven as follows. Let A be an order-dependent ACL $(a_1, a_2, \ldots, a_n)$, and B its order-free equivalent, which is initially set to empty. Construction begins with removing $a_n$ from A and putting it as $b_1$ into B. Then, for each entry $a_i$ removed from A, one may substitute every entry $b_k \in B$ with $b_k$'s spinoff entries ($V_1(I(a_i), I(b_k))$, S $(b_k))$, and then put $a_i$ into B. This process is continued until A is empty. Lemma 1 and Corollary 1 set forth above ensure that B contains a unique order-free equivalent. A process 200 for converting an order dependent ACL into an order free equivalent is set forth in FIG. 3.

According to process 200, an entry higher in an ACL takes precedence over an entry which is lower. To reflect such a precedence ordering, a stack/queue (e.g., a LIFO queue) is created in which all the entries are pushed in sequentially with the highest one first. Then one entry is popped at a time. Because the latest popped entry has higher precedence ordering over all entries that have been popped so far, it is put in the order-free ACL being constructed as it is. All the other entries in the temporary order-free constructed so far are checked for any overlap with the latest one. If there is any overlap, the order-free entries constructed in previous steps are modified so that the spinoff entries have no overlap with the latest one, while at the same time maintaining the semantic equivalence.

Process 200 is explained as follows. The process is initialized at block 202, where a set of standard ACL entries ($a_1, a_2, \ldots, a_n$) are obtained, e.g., from a router's ACL list. A pair of local stacks or queues, e.g., a first queue "F" and a second queue "T" are initialized as shown at block 204. At block 206, the first queue F is populated with ACL entries $a_i$. This is repeated for all n entries.

As shown at block 208, the topmost entry a is obtained from the first queue F. Then, at block 210, a's relationship is checked with a first entry b in memory Q. In one example, memory Q is a LIFO stack. All rules in Q are order-free with respect to the original rules processed so far. All rules in F are intact and in the original order. Each (original) rule in F (popped out in FILO fashion) needs to be compared with each rules in Q. If a rule popped out from F overlaps with a rule in Q, then the scope of the rule in Q needs to be modified so that the modified rule (which does not overlap with the rule in F) is then reinserted back to Q. Since rules in F precede rules in Q, when a rule popped out from F, it checks all rules in Q, and modifies the scope of rules if overlap occurs. After this check is completed, it is then inserted to Q. The process ends until F becomes empty, and then Q contains order-free rules (equivalents).

As shown in block 212, the process evaluates whether a overlaps b, contains b or is disjoint with b. Or does a enclose b. For instance, does $a_i$ enclose $a_{i+1}$ such as is shown in FIG. 2C? If so, this signifies that b is redundant. In this case, the process proceeds to block 214 where b is flagged as redundant. If not, meaning that a either overlaps, contains or disjoins b, then the process proceeds to block 216. Here, one or more spinoffs of b are generated. For the case where the queue T is a LIFO queue, the spinoff may be created by putting the spinoff into T as follows: T.put(($V_1(I(a),I(b)),S(b)$)). Then at block 218 these spinoffs are added to the second queue T.

The process then proceeds to block 220. Here, if the memory Q is not empty, e.g., one or more entries remain in a LIFO stack, the process returns to block 210, where a is evaluated against the next entry b. Otherwise, the process proceeds to block 222.

Here, if the first queue F is not empty, e.g., one or more a entries remain in a LIFO stack, then the process returns to block 208, where the next most recent entry a in the first queue F is obtained. Otherwise, the process proceeds to block 224. Here, any intermediate entries that are in the second queue T are transferred into memory Q. For instance, if second queue T is implemented as a stack-type storage memory, each entry is popped from the stack and placed in the memory Q, which may also be a stack-type memory. This is done until the second queue T is empty.

Then, as shown in block 226, entry a is added from first queue F into memory Q. Each entry preferably represents a single rule of an ACL. At block 228, optimization is performed to minimize the number of order-free entries. In one example, all entries may be sorted by the left endpoint in the interval in Q(O log(n) in running time). Adjacent entries having the same classification status may be merged as part of the minimization process. For instance, two entries $a_i=(I_1,S)_i$ and $a_j=(I_1,S)_j$ are said to be adjacent iff $(a_L)_i=(a_R)_j+1$ or $(a_L)_j=(a_R)_i+1$. The complexity of the merging process is known merging process is known to be linear since Lemma 1 ensures that all (either intermediate or final) entries in Q are disjoint. The overall translation process can be carried out in $O(n^2)$, where n is the ACL size. Then, as shown in block 230, the results from Q—order-free equivalents—may be provided, e.g., to a user via a graphical user interface or stored electronically for later analysis. Then the process ends as shown at block 232.

In view of the above, one question of interest is for an order-dependent ACL with size of n, what is the size of the corresponding order-free ACL? The following lemma gives an upper bound on the size of order-free equivalent with respect to the size of order-dependent one.

Lemma 2. Let n be the size of order-dependent standard ACL, and k(n) be the size of its order-free equivalent. In this case, $k(n) \leq 2n$.

FIGS. 4(a)-(b) illustrate a worst-case scenario that maximizes the size of the order-free ACL. FIG. 4(a) denotes an order-dependent ACL 300 and FIG. 4(b) shows an order-free ACL 302. Here, the shaded bars 304 denote deny ranges and the unshaded bars 306 denote permit ranges. FIG. 4(a) denotes an order-dependent ACL 306 of size 4 while FIG. 4(b) shows the order-free ACL of size 7. This observation prompts a definition of ACL "complexity."

Definition 9. Let n be the size of a non-redundant ACL A, and m be the size of its order-free ACL equivalent. Then the complexity of this ACL is m/n, denoted as $\psi(A)$.

The rationale behind this definition may be explained as follows. The presence of redundant entries is entirely irrelevant to the execution outcome of an ACL, and does not contribute to the complexity of the ACL. Therefore, such a redundancy should be excluded from complexity consideration. An order-free equivalent may be considered as a factored representation of its original ACL. Each order-free free equivalent entry is a basic building block. Thus the number of basic building blocks is an attribute of the ACL. The function $\psi(A)$ captures the essence of ACL complexity. It follows from lemma 2 and definition 9 that complexity of a standard ACL is bounded by a constant independent of the ACL's size, ranging between 1 and 2.

The next section focuses on extended ACLs, which can be formulated as a 5-dimensional range problem. Rather than dealing with this geometric problem in an ad hoc fashion, a general framework is provided that is applicable to an arbitrary number of dimensions.

An extended ACL entry according to aspects of the invention may be expressed as $I_1 \otimes I_2 \otimes I_3 \otimes I_4 \otimes I_5 \otimes S$, where S is the image of the Cartesian product of its intervals in 5 orthogonal dimensions, denoted by $(I_1, I_2, I_3, I_4, I_5, S)$ and S represents a binary action of permit or deny. For the ith entry in an extended ACL, it can be written as $a_i = (I_1, I_2, I_3, I_4, I_5, S)_i$, and $I_j(a_i)$, $1 \leq j \leq 5$ refers to the jth interval of $a_i$, respectively.

The following table shows an example of a protocol range and port range number assignments based on an IP protocol specification. Notice that both tcp and udp are a point in the protocol dimension, and the IP protocol is in the full range of the protocol dimension. The port number range is given as [0, 65535].

TABLE

Protocol Range Assignment

IP [0:255]

| hopop [0, 0] | ... | tcp [6, 6] | ... | udp [17, 17] | ... | reserved [255, 255] |
|---|---|---|---|---|---|---|

| Port operator operands | | | | | Port number |
|---|---|---|---|---|---|
| Symbol | lt | gt | eq | neq | range | Range |
| Meaning | < | > | = | ≠ | [,] | [0, 65535] |

The following example illustrates how to translate an extended ACL entry to its range representation:

access-list 101 permit udp 172.16.4.0 0.0.0.255 neq 120 172.16.3.0 0.0.0.255 neq 40

This entry states that UDP traffic from source subnet 172.16.4.0/24 with a source port not equal to 120, destined to the destination subnet 172.16.3.0/24 with a destination port not equal ("neq") to 40, is permitted ("permit").

The next table presents a mapping between the different IP addresses, ports and traffic type in the ACL entry and their range representations.

TABLE

Extended ACL and Range Representation

| Extended ACL | | Range Representation |
|---|---|---|
| source IP | mask | source IP address $I_1$ |
| 172.16.4.0 | 0.0.0.255 | [2886730752, 2886731008] |
| source port | | source port $I_2$ |
| neq 120 | | [0, 119], [121, 65535] |
| destination IP | mask | destination IP address $I_3$ |
| 172.16.3.0 | 0.0.0.255 | [2886730496, 2886730752] |
| destination port | | port $I_4$ |
| neq 40 | | [0, 39], [41, 65535] |
| Protocol | | protocol $I_5$ |
| udp | | [17, 17] |

The port number is in the range of [0, 65535]. Thus, the neq 40 on the IP destination port is equivalent to two destination port ranges [0, 39] and [39, 65535]. In a similar manner, the neq 120 on source IP port is identical to two source port ranges [0,119] and [121, 65535]. Hence, this entry corresponds to four range representations specified below:

(I1,[0,119],I3,I4,[0,39],0)
(I1,[0,119],I3,I4,[41,65535],0)
(I1,[121,65535],I3,I4,[0,39],0)
(I1,[121,65535],I3,I4,[41,65535],0)

An extended ACL entry might yield different range representation entries, depending on the port operator operand being applied on both the source port and destination port. For an extended ACL with size of n, the size of its range representation is bounded by 4n. The notion of order dependency can be employed to extend an ACL as follows.

Definition 10. An extended ACL A is said to be order independent iff $a_i$, $a_j$, A, I j, there exists at least $1 \leq k \leq d$ such that the intersection of the k-interval of $a_i$, and $a_j$, i.e., $$\exists_{1 \leq k \leq 5} I_k(a_i) \cap I_k(a_j) = 0.$$

A is order dependent iff the intersection of all k-intervals of $a_i$ and $a_j$ are non-empty, i.e., $$\forall_{1 \leq k \leq d} I_k(a_i) \cap I_k(a_j) \neq 0.$$

Given this, a d-box partition may be defined as follows.

Definition 11. A d-box partition of $O \subset R^d$ is a set of non-empty d-boxes denoted $\{B_1^d, \ldots, B_k^d\}$ such that the union of $B_i$'s is equal to O and the intersection of $B_i^d$ and $B_j^d$ is empty for any distinct $B_i^d$ and $B_j^d$.

Consider the following example with regard to FIGS. 5(a)-(f). These figures depict an ACL containing two entries that intersect with one another. One entry, $a_1$, is represented by a shaded rectangle, while the other entry, $a_2$, is represented by an unshaded region.

Entry $a_1$ precedes entry $a_2$, and as a result, the scope of entry $a_2$ is altered (contracted) accordingly. Consequently, this is shown by a multiplicity of partitions. The altered/contracted areas are called spinoffs. The order-dependent effect on entry $a_2$ is the ratio of the sum volume of spinoffs to the original volume. In the case shown in FIGS. 5(a)-(f), the sum volume of spinoffs is equal to the area (scope) of $a_2$ minus the area of $a_1$.

Figure 5C:
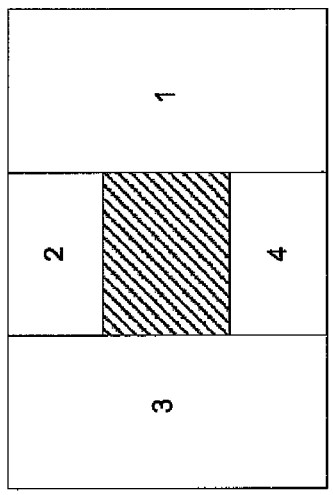
FIGS. 5(a)-(f) illustrate d-box two-dimensional examples in accordance with aspects of the invention.
Figure 5B:
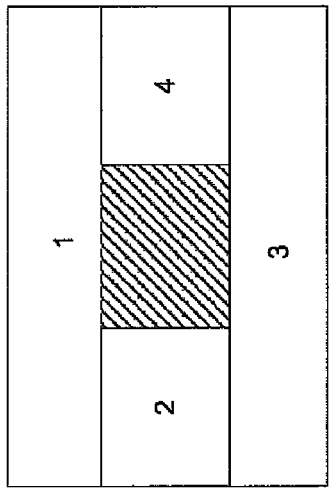
Figure 5A:
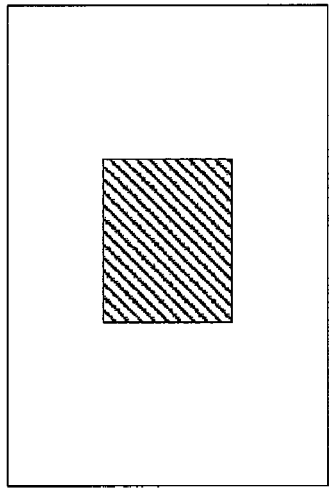
Figure 5F:
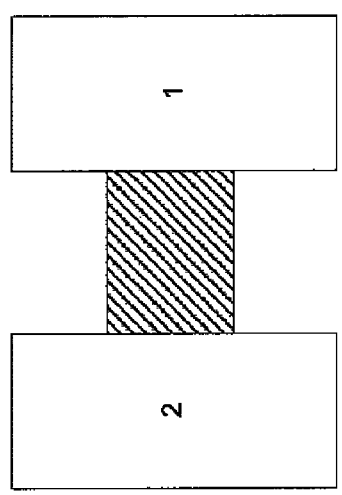
Figure 5E:
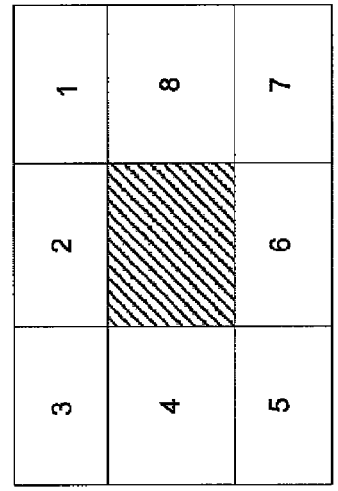
Figure 5D:
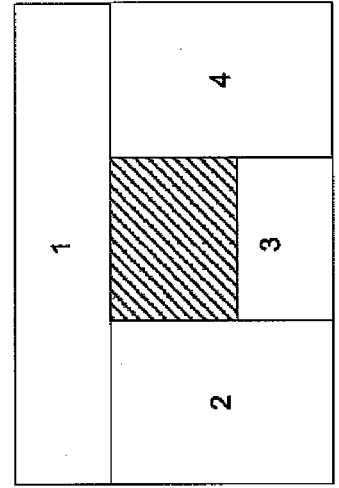

In one example, $a_1$=([4,7],[4,7],0) (shaded rectangle in FIG. 5(a)), and $a_2$=([1,10],[1,10],1) (unshaded rectangle in FIG. 5(a)) ($a_2 \pi a_1$). The 2-box of $a_2$ [1,10]⊗[1,10] minus the 2-box of $a_1$ [4,7]⊗[4,7] could yield many distinct d-box partitions. FIGS. 5(b)-(e) depict four 2-box partitions with different sizes. The d-box partitions in FIGS. 5(b)-(d) have the size of 4 while one shown in FIG. 5(e) shown in FIG. 5(e) has the size of 8. FIG. 5(f) clearly is not a d-box partition because there exists an unfilled area. Translation of an order dependent ACL into its order-free equivalent it tantamount to identifying a d-box partition. The following table compares an order-dependent ACL versus an order-free equivalent.

TABLE

| order-dependent ACL versus an order-free equivalent | | |
|---|---|---|
| Order dependent entry pair ($a_1$, $a_2$) | | |
| ([4, 7], [4, 7], 0) | ([1, 10], [1, 10], 1) | |
| | Order-free equivalent | |
| ([1, 3], [1, 10], 1) | ([8, 10], [1, 10], 1) | ([4, 7], [1, 3], 1), |
| ([4, 7], [8, 10], 1) | ([4, 7], [4, 7], 0) | |

However, there are several difficulties in extended ACLs. For instance, translation of an order-dependent ACL to an order-free equivalent is not unique for a multi-dimensional case because the number of possibilities grows exponentially with the dimensionality. And order independency does not necessarily mean semantic equivalency, as shown by the incomplete partition case of FIG. 5(f).

In order to develop a proper framework and procedure for determining an order-free equivalent partition, the $V_k()$ function is introduced as follows. Let $A^d$=($I_1, \ldots, I_d)_a$ and $B^d$=($I_1 \ldots, I_d)_b$ be two d-boxes, $I_i(A^d)$ be the ith closed interval of the $A^k$ box, and $\otimes_{i=1}^t I_i(A^d) \Leftrightarrow I_1(A^d) \otimes \ldots \otimes I_k(A^d)$, where $1 \leq k \leq d$, which is a k-dimensional projection of $A^d$. It can be seen that $\otimes_{i=1}^t I_i(A^d) \equiv A^d$. Let $\cap I_i(A^d, B^d) = I_i(A^d) \cap I_i(B^d)$ be the ith intersecting interval of $A^d$ and $B^d$.

Definition 12. Let $A^d$ and $B^d$ be two d-boxes. The function $V_k(A^d,B^d)$ is defined as:

$$V_k(\mathcal{A}^d, \mathcal{B}^d) = \bigotimes_{i=1}^{k} I_i(\mathcal{B}^d) \ominus \bigotimes_{i=1}^{k} \bigcap I_i(\mathcal{A}^d, \mathcal{B}^d) \quad (10)$$

$V_k(A^d, B^d)$ is referred to as a k-dimension projection of $B^d$ minus a k-dimension projection of the intersection of $A^d$ and $B^d$. $V_k()$ is clearly not symmetrical. Let $|V_k(A^d, B^d)|$ denote the volume of $V_k(A^d,B^d)$, which can be expressed as follows.

$$|V_k(\mathcal{A}^d, \mathcal{B}^d)| = \prod_{i=1}^{k} |I_i(\mathcal{B}^d)| - \prod_{i=1}^{k} |\bigcap I_i(\mathcal{A}^d, \mathcal{B}^d)| \quad (11)$$

This equation states that the volume of $V_k(A^d,B^d)$ equals the k-dimensional projection volume of $B^d$ subtracted by the k-dimensional projection volume of the intersection of $A^d$ and $B^d$. It should be noted that the $V_k$ function is a multidimensional extension to the $V_1$ function set forth above.

Figure 6A:
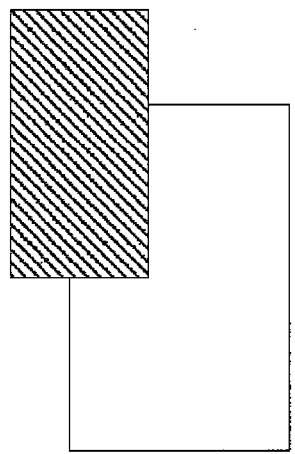
FIG. 6(a)-(f) illustrate 2-d box partitions in accordance with aspects of the present invention.
Figure 6B:
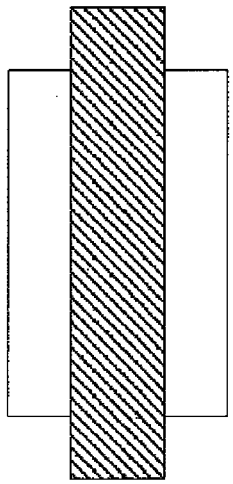
Figure 6C:
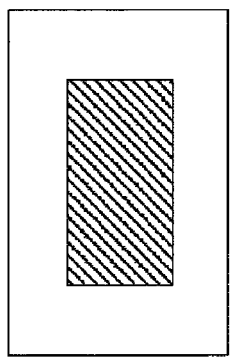
Figure 6D:
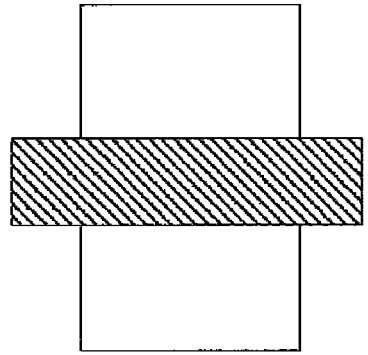
Figure 6E:
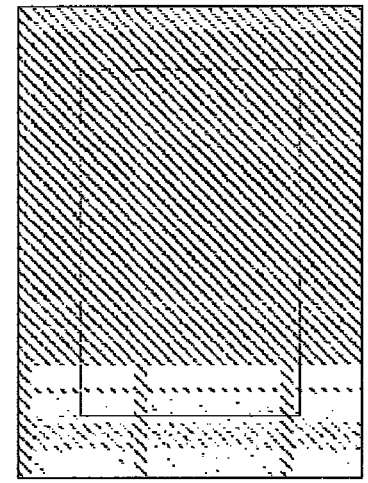
Figure 6F:
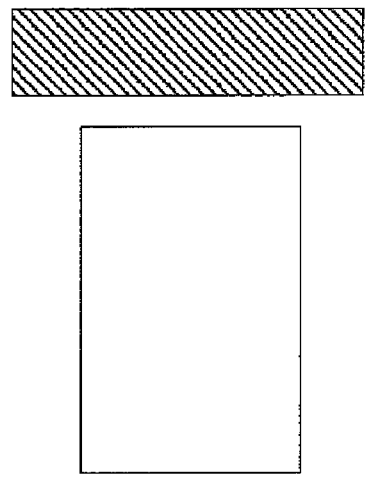

As an illustration, FIGS. 6(a)-(f) depict some of many possibilities of $V_2(A^2,B^2)$ under different arrangements of $A^2$ (shaded rectangles) and $B^2$ (unshaded rectangles). FIGS. 6(e)-(f) represent two extreme cases. In particular, FIG. 6(e) shows that $V_2(A^2,B^2)$ becomes empty as $A^2$ completely encloses $B^2$. And FIG. 6(f) indicates that $V_2(A^2,B^2)$ can yield many distinct 2-box partitions.

Let $A^d$=($I_1, \ldots, I_d)_a$ and $B^d$=($I_1, \ldots, I_d)_b$ be two d-boxes. Let $\otimes_{i=1}^t \cap I_i(A^d, B^d)$ be denoted by $\cap V_k(A^d,B^d)$. For all positive integers $2 \leq k \leq d$, $$V_k(A^d,B^d) = V_{k-1}(A^d,B^d) \otimes I_k(B^d)) \oplus (\cap V_{k-1}(A^d, B^d) \otimes (I_k(B^d) \ominus \cap I_k(A^d,B^d))) \quad (12)$$

with the initial value $V_1(A^d,B^d)=I_1(B^d) \ominus \cap I_1(A^d,B^d)$. This results in the following equation:

$$V_k = \bigotimes_{i=1}^{k} I_i(\mathcal{B}^d) \ominus \bigotimes_{i=1}^{k} \bigcap I_i = \bigotimes_{i=1}^{k} I_i(\mathcal{B}^d) \ominus \bigcap V_k \quad (13)$$

Observe that $V_1(A^d,B^d)=I_1(B^d) \ominus \cap I_1(A^d,B^d)$ is the seed value for the recurrence relation ($2 \leq k \leq d$). To establish the recurrence relation, consider $$V_k \otimes (I_{k+1}(\mathcal{B}^d) \oplus \bigcap I_{k+1}) = \quad (14)$$

$$V_{k+1} \ominus \bigcap V_{k+1} \ominus I_{k+1}(\mathcal{B}^d) \otimes \bigcap V_k \oplus \bigotimes_{i=1}^{k} I_i(\mathcal{B}^d) \otimes \bigcap I_{k+1}$$

A simplified version of this equation yields:

$$V_k \otimes (I_{k+1}(\mathcal{B}^d) \oplus \bigcap I_{k+1}) = \quad (15)$$

$$V_{k+1} \ominus I_{k+1}(\mathcal{B}^d) \otimes \bigcap V_k \oplus \bigotimes_{i=1}^{k} I_i(\mathcal{B}^d) \otimes \bigcap I_{k+1}$$

Combining equations 13 and 15 yields:

$$V_{k+1} = V_k \otimes I_{k+1}(\mathcal{B}^d) \oplus I_{k+1}(\mathcal{B}^d) \otimes \bigcap V_k \ominus \quad (16)$$

$$\bigotimes_{i=1}^{k} I_i(\mathcal{B}^d) \otimes \bigcap I_{k+1} \oplus V_k \otimes \bigcap I_{k+1}$$

$$= V_k \otimes I_{k+1}(\mathcal{B}^d) \oplus \bigcap V_k \otimes (I_{k+1}(\mathcal{B}^d) \ominus \bigcap I_{k+1})$$

Lemma 3. For all positive integers $1 \leq k \leq d$, $V_k(A^d,B^d)$ and $\cap V_k(A^d,B^d)$ are disjoint. This may be proven by:

$$V_k(\mathcal{A}^d, \mathcal{B}^d) \cap \bigcap V_k(\mathcal{A}^d, \mathcal{B}^d) = \quad (17)$$

$$\left( \bigotimes_{i=1}^{k} I_i(\mathcal{B}^d) \ominus \bigcap V_k(\mathcal{A}^d, \mathcal{B}^d) \right) \cap \left( \bigcap V_k(\mathcal{A}^d, \mathcal{B}^d) \right) = \emptyset$$

Furthermore, a d-box partition of $V_d(A^d,B^d)$ is expressed as follows:

$$\bigoplus_{i=1}^{d}\left(\bigcap V_{d-i} \otimes V_1(I_{d-i+1}(\mathcal{A}^d), I_{d-i+1}(\mathcal{B}^d)) \otimes \bigotimes_{k=d-i+2}^{d} I_k(\mathcal{B}^d)\right) \quad (18)$$

This may be proven as follows. $V_1(I_d(A^d), I_d(B^d)) \equiv I_d(B_d) \ominus \cap I_d$. $V_d(A^d, B^d)$ is partitioned into two disjoint parts:

$$\frac{1}{V_d^d} = \frac{1}{V_{d-1}^{d-1}} \otimes I_d(\mathcal{B}^d) \oplus \frac{1}{\bigcap V_{d-1}} \otimes \overline{(I_d(\mathcal{B}^d) \ominus \bigcap I_d)} \quad (19)$$

This implies that $\bigcap V_{d-1} \otimes V_1(I_d(A^d), I_d(B_d))$ and $V_{d-1} \otimes I_d(B^d)$ are disjoint since $\bigcap V_{d-1} \cap V_{d-1} = 0$ based on Lemma 3. Turn next to $V_{d-1} \otimes I_d(B^d)$. Based on the recurrence relation set forth above, this term can be further partitioned into two disjoint parts:

$$V_{d-1} \otimes I_d(\mathcal{B}^d) = V_{d-2} \otimes I_{d-1}(\mathcal{B}^d) \otimes I_d(\mathcal{B}^d) \oplus \quad (20)$$

$$\frac{1}{\bigcap V_{d-2}} \otimes \overline{V_1(I_{d-1}(\mathcal{A}^d), I_{d-1}(\mathcal{B}^d))} \otimes \overline{I_d(\mathcal{B}^d)}$$

Furthermore, it can be inferred that there is no intersection between:

1) $\bigcap V_{d-1} \otimes V_1(I_d(A^d), I_d(B^d))$ (21)

2) $\bigcap V_{d-2} \otimes V_1(I_{d-1}(A^d), I_{d-1}(B^d)) \otimes I_d(B^d)$ (22)

because $\bigcap V_{d-1} \otimes V_1(I_d(A^d), I_d(B^d)) \cap V_{d-1} \otimes I_d(B^d) = 0$. This process is repeated until the initial value for the recurrence relation is reached.

$$V_2 \otimes \bigotimes_{i=3}^{d} I_i(\mathcal{B}^d) = \quad (23)$$

$$\bigcap V_1 \otimes P(I_2(\mathcal{A}^d), I_2(\mathcal{B}^d)) \otimes \bigotimes_{k=3}^{d} I_k(\mathcal{B}^d) \oplus V_1 \otimes \bigotimes_{k=2}^{d} I_k(\mathcal{B}^d)$$

Summing up all results gives rise to the following.

$$V_d = \bigoplus_{i=1}^{d}\left(\bigcap V_{d-i} \otimes V_1(I_{d-i+1}(\mathcal{A}^d), I_{d-i+1}(\mathcal{B}^d)) \otimes \bigotimes_{k=d-i+2}^{d} I_k(\mathcal{B}^d)\right) \quad (24)$$

Note that $V_1(I_1(A^d), I_1(B^d)) \equiv V_1(A^d, B^d)$. It is shown that d-boxes in equation (24) are disjoint, and hence form a d-box partition of $V_d(A^d, B^d)$. This has important implications. For instance, it provides a recursive method of obtaining a d-box partition of $V(A^n, B^n)$. It also offers an efficient piecemeal means for computing the d-box partition, thereby overcoming a significant dimensionality-induced complexity. For instance, identifying a d-box partition of equations (21) and (22) is reduced to identifying an 1-box partition of $V_1(I_d(A^d), I_d(B^d))$ and $V_1(I_{d-1}(B^d))$.

Lemma 4. Let $A^d = (I_1, \ldots, I_d)_a$ and $B^d = (I_1, \ldots, I_d)_b$ be two d-dimensional boxes. Let $C_i^d, \ldots, C_i^m$ be a set of d-boxes obtained via equation (18). Then there is no intersection among An, $C_1^n, \ldots, C_m^n$. Thus, it may be proven that:

$$\mathcal{A}^d \cap V_d(\mathcal{A}^d, \mathcal{B}^d) = \mathcal{A}^d \cap (\mathcal{B}^d \ominus \Delta V_d(\mathcal{A}^d, \mathcal{B}^d)) \quad (25)$$

$$= \Delta V_d(\mathcal{A}^d, \mathcal{B}^d) \ominus \Delta V_d(\mathcal{A}^d, \mathcal{B}^d) = \emptyset$$

This equation implies that $A^d \cap C_k^d = 0$. Since $C_1^d, \ldots, C_m^d$ form a d-box partition of $V_d(A^d, B^d)$, then $C_i^d \cap C_j^d = 0$ with $i \neq j$. The lemma is thus proved. This leads to the following aspect of the invention. For a given pair of two extended ACL entries $a_i = (B^5, S)_i$, $a_j = (B^5, S)_j$ ($a_j \pi a_i$), the union of $a_i$ and $(\{V_5(B_i^5, B_j^5)\}, S(a_j))$ is an order-free equivalent to entry pair $a_i$ and $a_j$. This may be established by noting that it follows from Lemma 4 that $B_i^5$ and $V_5(B_i^5, B_i^5)$ are disjoint.

As an illustration, an example from FIGS. 5(a)-(f) may be used to show how to partition. $V_n(A'', B'')$ into a set of d-boxes in a piecemeal fashion and how to construct the order independent equivalent ACLs for a given order dependent extended ACL pair $a_i$ and $a_j(a_j \pi a_i)$.

TABLE

| Piecemeal Computation | |
|---|---|
| Initial setting | |
| $a_1 = ([4, 7], [4, 7], 0)$ | $a_2 = ([1, 10], [1, 10], 1)$ |
| $A^2 = ([4, 7], [4, 7])$ | $B^2 = ([1, 10][1, 10])$ |
| $I_1(A^2) = I_2(A^2) = [4, 7]$ | $I_1(B^2) = I_2(B^2) = [1, 10]$ |
| $\Delta V_0 = \emptyset$ | $V_0 = \emptyset$ |
| Computing $V_1(A^2, B^2)$ | |
| $\Delta I_1(A^2, B^2)$ | $[4, 7] \cap [1, 10] = [4, 7]$ |
| $I_1(B^2) \ominus \Delta I_1(A^2, B^2)$ | $[1, 10] \ominus [4, 7] = \{[1, 3], [8, 10]\}$ |
| $\Delta V_1(A^2, B^2)$ | $\Delta I(A^2, B^2) = [4, 7]$ |
| $V_1(A^2, B^2)$ | $I_1(B^2) \ominus \Delta I_1(A^2, B^2) = \{[1, 3], [8, 10]\}$ |
| Computing $V_2(A^2, B^2)$ | |
| $\Delta I_2(A^2, B^2)$ | $[4, 7] \cap [1, 10] = [4, 7]$ |
| $I_2(B^2 \ominus \Delta I_2(A^2, B^2)$ | $[1, 10] \ominus [4, 7] = [1, 3], [8, 10]$ |
| $V_1(A^2, B^2) \otimes I_2(B^2)$ | $\{[1, 3], [8, 10]\} \otimes [1, 10] =$ $([1, 3], [1, 10]), ([8, 10], [1, 10])$ |
| $\Delta V_1(A^2, B^2) \otimes$ $(I_2(B^2) \ominus \Delta I_2(A^2, B^2))$ | $[4, 7] \otimes \{[1, 3], [8, 10]\} =$ $([4, 7], [1, 3]), ([4, 7], [8, 10])$ |
| $\Delta V_2(A^2, B^2)$ | $\Delta I_1 \otimes \Delta I_2 = ([4, 7], [4, 7])$ |
| $V_2(A^2, B^2)$ | $([1, 3], [1, 10]), ([8, 10], [1, 10])$ $([4, 7], [1, 3]), ([4, 7], [8, 10])$ |
| Computing order independent ACLs | |
| $a_1, (\{V_2(A^2, B^2\}, 1)$ | $([1, 3], [1, 10], 1), ([8, 10], [1, 10], 1)$ $([4, 7], [1, 3], 1), ([4, 7], [8, 10], 1)$ $([4, 7], [1, 3], 1), ([4, 7], [8, 10], 1)$ $([4, 7], [4, 7], 0)$ |

For a given extended ACL $(a_1, \ldots, a_n)$, one can extend the ACL procedure of FIG. 3 to construct an order independent equivalent. Almost all processes in the procedure of FIG. 3 may be kept intact, except for putting the spinoff into queue T. In the present case, the operation may be as follows: T.put $((V_5(a,b)), S(b)))$. Despite the similarity in the processing flow, the complexity analysis of translating an extended ACL into its order-free equivalent may be much harder because of dimensionality.

A worst-case analysis of the procedure is provided as follows. First an upper bound on the size of the order-free equivalent based on the concept of trellis is given. Then a discussion of the worst-case complexity analysis of the algorithm is provided. The following definition and lemma are provided to facilitate the proof.

Definition 13. For $x = (x_1, \ldots, x_n)$, $y = (y_1, \ldots, y_n) \in R^n_{++}$, where $R^n_{++} = (0, \infty)$, let $x_{[1]} \geq x_{[n]}$ and $y_{[1]} \geq \ldots \geq y_{[n]}$ denote the components of x and y in decreasing order. Then $$\text{if } \begin{cases} \sum_{i=1}^{k} x_{[i]} \leq \sum_{i=1}^{k} y_{[i]} & 1 \leq k \leq n-1 \\ \sum_{i=1}^{k} x_{[i]} = \sum_{i=1}^{k} y_{[i]} & k = n \end{cases} \quad (26)$$

then y majorizes x. And according to lemma 5, if y "majorizes" x, then $$\prod_{i=1}^{n} y_i \leq \prod_{i=1}^{n} x_i.$$

An immediate consequence of lemma is that $$\prod_{i=1}^{n} x_i \leq \bar{x}^n,$$

where $$\bar{x} = \sum_{i=1}^{n} x_i/n \text{ since } x = (x_i, \ldots, x_n)$$

majorizes $(\bar{x}, \ldots, \bar{x})$.

Theorem: let n be the size of an order dependent extended ACL, then the maximum size of order-free equivalent is bounded by $O((n/d)^d)$ where d the number of dimensions (e.g., d=5 for extended ACL). This can be proven based on the notion of trellises. One can construct a d-dimensional trellis overlapped pattern among ACL entries and prove that this overlapped pattern yields the maximum size of the order independent equivalent.

For instance, let $n_i$ be the number of disjoint intervals on the i dimensional space and $$\sum_{i=1}^{d} n_i = n.$$

An order dependent extended ACL can be constructed as follows. For the last $n_1$ entries, construct the $n_1$ disjoint intervals on $I_1$, while assigning the full ranges to $I_2, \ldots, I_d$. For last entries from $n-(n_1+1)$ to $n-(n_1+n_2)$, construct the $n_2$ disjoint intervals on $I_2$, while assigning the full ranges to $I_1, I_3, \ldots, I_d$ and so on so forth. Under this setting, the cross-section area of $I_1 \otimes I_2$ is partitioned into $n_1$ piecewise disjoint rectangles, called "slabs," by vertical lines parallel to the y-axis. Next, each vertical rectangle is partitioned into n2 rectangles, cells, by lines parallel to the x-axis (see FIG. 7). Thus the total number of intersections ("cells") is $n_1 \times n_2$.

Figure 7:
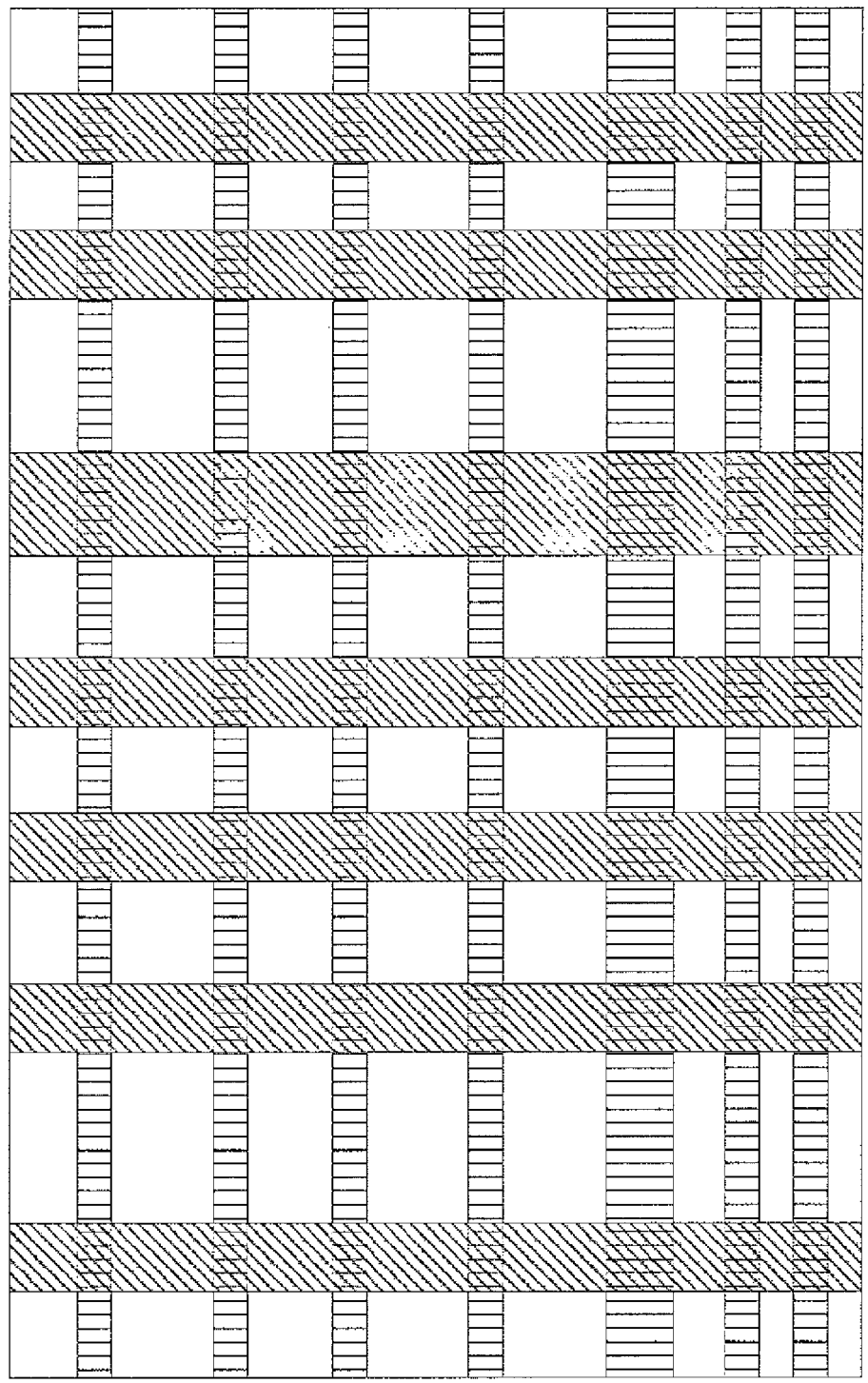
FIG. 7 illustrates a two-dimensional trellis for use with aspects of the present invention.

By the ACL's hereditary property, each long horizontal shaded rectangle in FIG. 7 is split into $n_2+1$ disjoint pieces by the $n_2$ long vertical hatched rectangles. Hence the number of disjoint rectangles (2-boxes) is proportional to $n_1(n_2+1)=O(n_1 n_2)$. Thus, the total number of d-box intersections (cells) is $$\prod_{i=1}^{d} n_i.$$

It follows from lemma 5 that $$\prod_{i=1}^{d} n_i \leq (n/d)^d$$

because $(n_1, \ldots, n_d)$ majorizes $(n/d, \ldots, n/d)$. Thus the maximum number of disjoint d-boxes is bounded by $O((n/d)^d)$.

A corollary (corollary 2) to this is that the complexity of an extended ACL is bound by $O((n/d)^{d-1})$. This corollary states that when involving more than one dimension, the complexity of an ACL depends not only on the number of dimensions d but also on the size of ACL n, in a contrast to the one-dimensional case in standard ACLs, the complexity of an ACL is bounded by $O(n/d)^0=O(1)$. This shows that complexity analysis of standard ACL in lemma 2 is a special case of this corollary where only one dimension is involved.

Next, it will be shown how to employ the framework to address some fundamental ACL problems, including efficient determination of semantic differences among ACLs, accurate identification of redundant entries, and quantitative evaluation of the impact of order-dependency on each entry in an ACL.

In one scenario, a comprehensive experimental study was conducted based on hundreds of extended ACLs gathered from a large enterprise network.

Definition 14. Let m be the size of order-free ACL equivalent A, $a_i=(B^d,S)_i$, $1 \leq i \leq m$. Let $|I_k(B_d)|_i$ and $1 \leq k \leq d$ be the kth interval length of $a_i$ and $S(a_i)$ be the classification status. The positive/negative volumes of that ACL are as follows:

$$V_p(\mathcal{A}) = \sum_{i=1}^{m} \prod_{k=1}^{d} |I_k(\mathcal{B}^d)|_i, \text{ if } S(a_i) = 1 \quad (27)$$

$$V_n(\mathcal{A}) = \sum_{i=1}^{m} \prod_{k=1}^{d} |I_k(\mathcal{B}^d)|_i, \text{ if } S(a_i) = 0 \quad (28)$$

where the subscripts p and n denote the positive/negative volumes, respectively. Furthermore, let I be an interval, and $I^L$ and $I^R$ be the left end and right end points of the interval I. Then the volume based hash function is defined as:

$$H_p(\mathcal{A}) = \sum_{i=1}^{m} \prod_{k=1}^{d} I_k^R(\mathcal{B}^d)^2 - (I_k^L(\mathcal{B}^d) - 1)^2, \text{ if } S(a_i) = 1 \quad (29)$$

$$H_n(\mathcal{A}) = \sum_{i=1}^{m} \prod_{k=1}^{d} I_k^R(\mathcal{B}^d)^2 - (I_k^L(\mathcal{B}^d) - 1)^2, \text{ if } S(a_i) = 0 \quad (30)$$

In accordance with an aspect of the invention, one step is to choose easily computable metrics. Then one may use these metrics to measure ACLs and compare the semantic difference in ACLs. The notion of the positive and negative volume of an ACL was introduced in definition 14 above.

Figure 8:
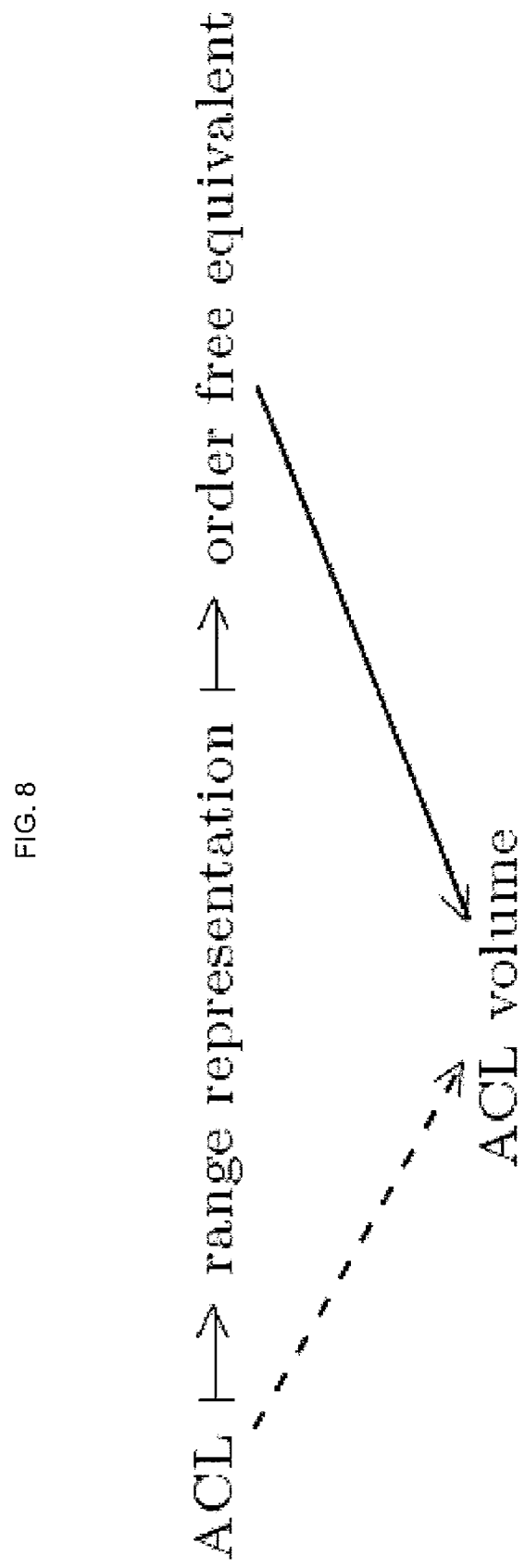
FIG. 8 illustrates equivalency between an order-dependent ACL and an order-free equivalent in accordance with aspects of the present invention.

A prerequisite of volume calculation is the equivalency between order-dependent ACL and order-free equivalent illustrated in the diagram of FIG. 8. It should be noted that the volume calculation of the union of d-boxes is closely associated with Klee's measure problem.

The volume determination process herein exploits the fact that d-boxes are disjoint. Hence the total volume of an ACL may be obtained by summing up the volume of each individual d-box. Thus, according to one aspect of the invention, the computational complexity is reduced to O(nd).

Piecemeal construction as set forth above allows one to build up a d-box partition recursively by gluing together the projected results on each dimension according to a given dimension ordering. Different dimension ordering for piecemeal construction may result in a different d-box partition. For example, FIG. 5(c) corresponds to the 2-box (rectangle) partition based on the x-y dimension ordering whereas FIG. 5(b) represents the 2-box (rectangle) partition from the y-x dimension ordering. There exist 5!=120 distinctly different d-box partitions for a 5-dimensional extended ACL. Once the dimension ordering is fixed, a d-box partition can be obtained uniquely.

The volume of an ACL defined in accordance with equations 27 and 28 has a particular geometric interpretation. In particular, it denotes the amount of d-dimension space it occupies and is invariant with the dimension ordering in the d-box partition. A small positive volume of an ACL implies a tighter control on traffic flow. The ACL volume appears to be an ideal quantitative security metric for enterprise networks. However, ACL volume constitutes an important condition for the semantic equivalence or relatedness of two ACLs. Thus, ACL volume may not be an ideal metric for discerning the semantic difference among ACLs because the semantic meaning of an ACL not only relies on its volume but also its position in d-dimensional space.

In view of this, the volume-based hash function introduced above in equations (29)-(30) may be employed as an index for efficiently discerning whether ACLs are semantically equivalent. $H_p(A)$ takes an order-free ACL as the input parameter and generates the hashed value that reflects the volume and position of the ACL. Another aspect of the invention focuses on minimizing the chance of collision, rather than on dictionary operations of a hash function such as INSERT, SEARCH, and DELETE. To make the hash function sensitive to both the volume and position, equations (29)-(30) are constructed as follows:

$$I_k^R(\mathcal{B}^d)^2 - (I_k^L(\mathcal{B}^d) - 1)^2 = (I_k^R(\mathcal{B}^d) - I_k^L(\mathcal{B}^d) + 1) \quad (31)$$

$$(I_k^R(\mathcal{B}^d) + I_k^L(\mathcal{B}^d) - 1)$$

$$= \overbrace{|I_k(\mathcal{B}^d)|}^{volume} \times \overbrace{(I_k^R(\mathcal{B}^d) + I_k^L(\mathcal{B}^d) - 1)}^{position}$$

Each element in equations (29)-(30) is a product of two conceptually different sub-elements, namely volume and position as shown in equation (31). Although the hash-based function may not guarantee 100% accuracy in discerning the semantic equivalence among ACLs in theory, in practice it is more than accurate enough to distinguish the subtle semantic differences among ACLs. One very attractive feature of this approach is its computational efficiency. It takes O(nd) time to compute the hash value for an order-free equivalent of size of n, and takes O(1) for comparing whether two ACLs are semantically identical.

Based on a multidimensional interval tree structure, the optimal run-time overhead of deterministic algorithm for determining whether two sets of d-boxes are identical is reported to be $O(n^2 \log^d n)$. By building on top of such a framework, it can be shown how to support redundancy detection and quantitative evaluation of the impact of order-dependency on each entry in a given ACL.

Figure 9:
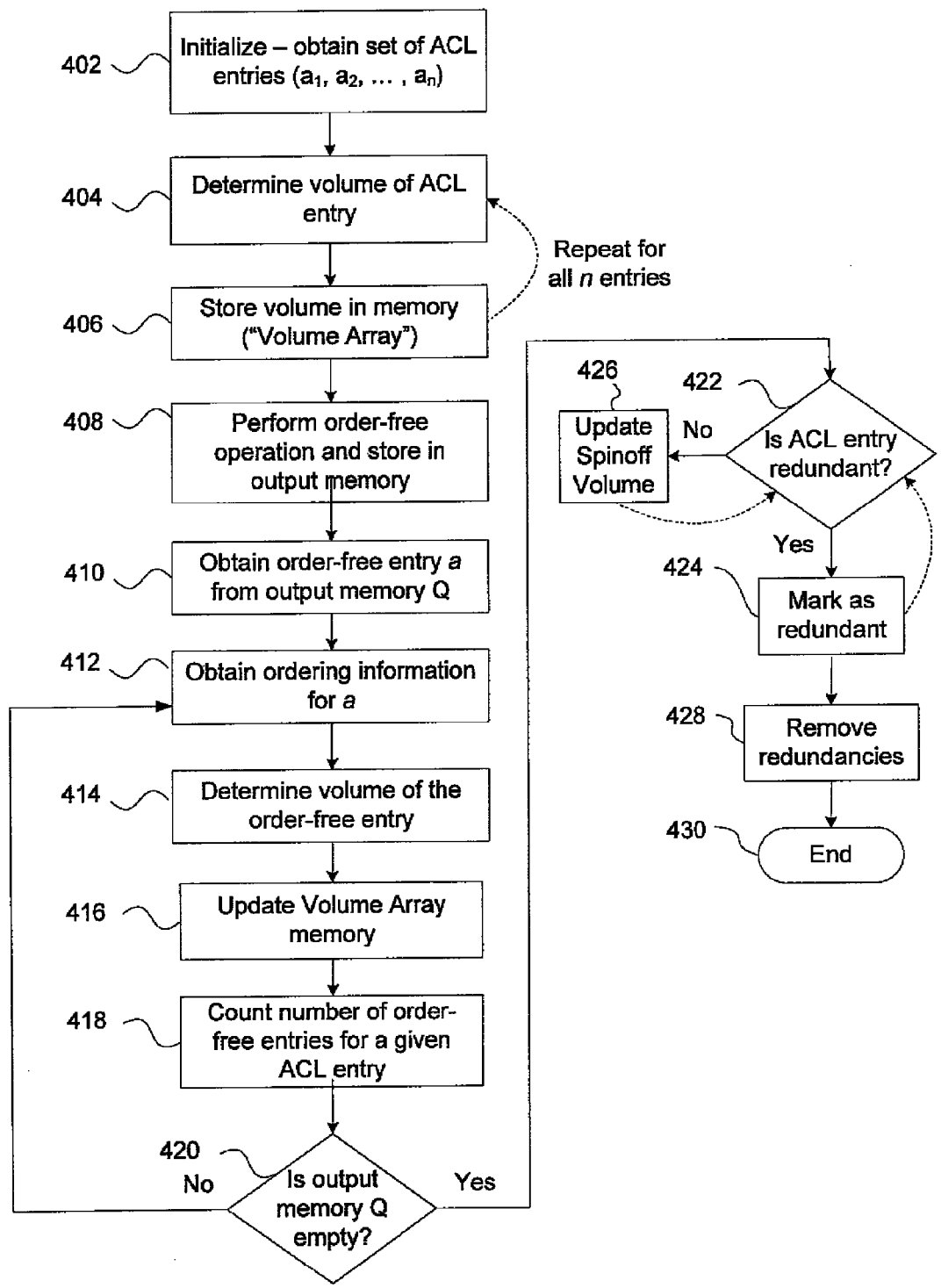
FIG. 9 is a flow diagram illustrating a redundancy detection process in accordance with aspects of the present invention.

FIG. 9 illustrates a process 400 for detecting redundancy in a given ACL. The process may initialize as shown in block 402 by obtaining the set of ACL entries. At block 404, the volume of a first ACL entry is determined. Spinoff rules mean that the rules are in order-free equivalents. Spinoff volume means the product of the length of each dimension. The volume of an ACL means the summation of all spinoff (order-free) rules in order-free equivalent). The volume is stored in memory at block 406. The memory may be configured as an array (e.g., a "Volume Array"). For instance an object may be constructed for entry $a_i$ and its ranking i and storing this object into a queue (e.g., a LIFO queue) F. This is repeated for all n ACL entries. The Volume Array is used to store spinoff entries, and is employed when determining the volume of an ACL.

As shown in block 408, an order-free operation is performed. This function uses the queue F as its input and a queue Q as its output. Q will contain the corresponding order-free equivalent a. The order-free operation may follow the the process set forth in FIG. 3.

At block 410, the order-free entry a is removed from the output queue Q (e.g., a LIFO queue). Then at block 412, the ordering information (e.g., sequence number) of the order-free entry is obtained. At block 414, the volume of this order-free entry is determined (e.g., "spinoff volume"), and at block 416 the Volume Array is updated in the corresponding entry. Then, at block 418, the number of order-free entries with respect to a given ACL entry are counted. If the output queue Q is not empty when checked at block 420, then the process returns to block 412 where the next order-free entry is processed.

Next, the degree of alteration for each ACL entry is computed. For instance, the scope contraction ratio $D(A,a_i)$ for each ACL entry may be computed. At block 422, it is checked whether an entry is redundant. For instance, for a given entry i, the process may evaluate whether the spinoff of is zero (e.g., spinoff[i]=0). If so, then that entry is marked as redundant at block 424. If it is not redundant, then the spinoff volume of that entry (i) is updated (e.g., spinoffvolume[i]=spinoffvolume[i]/volume[i]). If there are any other entries remaining, the process returns to block 422 as shown by the dashed lines. Redundant entries may be removed as shown in block 428, resulting in a modified ACL. The process terminates at block 430.

In one scenario in accordance with aspects of the invention, a set of standard ACLs was collected from an enterprise network and evaluated to uncover abnormalities hidden in the ACLs and to discern semantic differences among ACLs. Information concerning the set of standard ACLs is provided in the table below.

TABLE

Statistics for Standard ACLs

| min | max | mean | standard deviation |
|---|---|---|---|
| Complexity of Standard ACL: ψ(A) | | | |
| 1 | 1.917 | 1.628 | 0.412 |
| Redundant entries | | | |
| 1 | 9 | 4.4 | 3.96 |
| Ratio of redundant size to input size | | | |
| 0.053 | 0.225 | 0.1086 | 0.07 |

1.34% standard ACLs contain redundent entries

Figure 10:
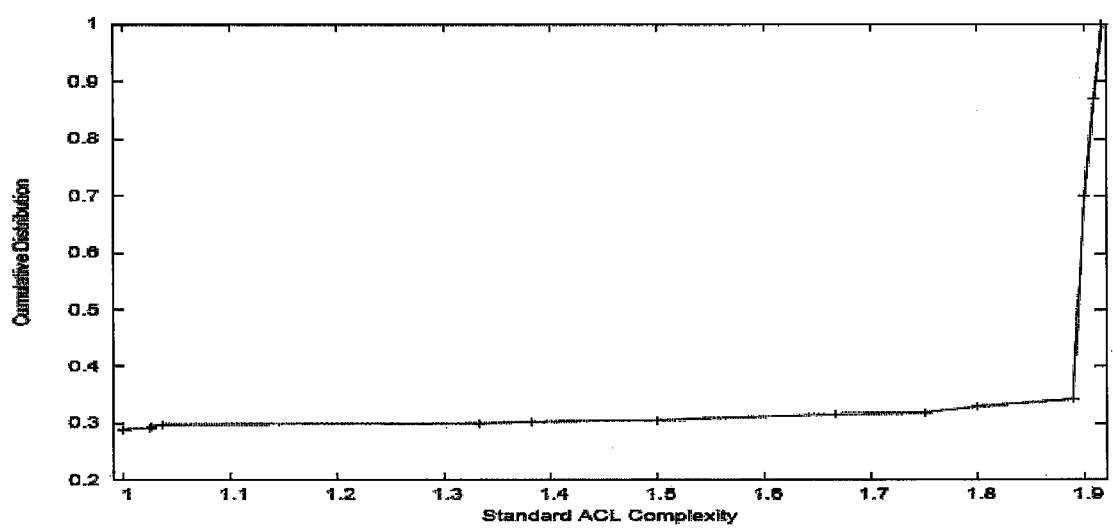
FIG. 10 illustrates ACL complexity distribution in accordance with aspects of the invention.

The above table shows that among the total of 373 standard ACLs analyzed, 5 contained redundant entries, accounting for roughly 1.34% of the total examined ACLs. The mean complexity $\psi(A)$ of the standard ACLs was 1.625. Complexity distribution can be seen in FIG. 10. This observation strongly suggests a general inclination of network administrators to put more specific entries before more general entries in an ACL, which is viewed as good practice in general. As also shown in the above table, a relatively low percentage 1.34% of ACLs contained redundant entries. This may be attributed to inexperienced network administrators or careless ACL editing.

Figure 11:
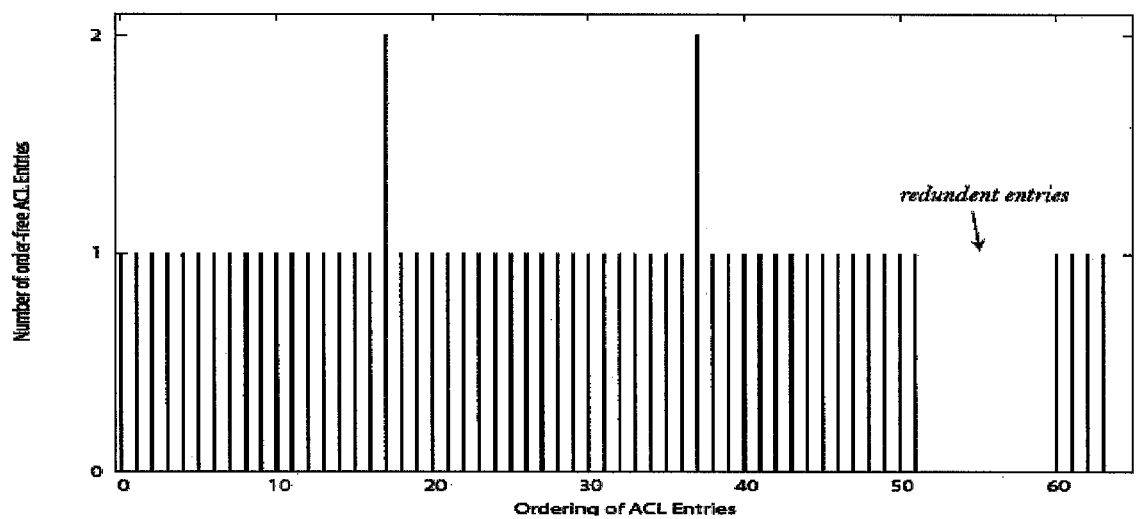
FIG. 11 illustrates ordering of ACL entries in accordance with aspects of the present invention.

The processes discussed above may be employed not only to translate an order-dependent ACL into an order-free ACL, but also to identify redundant entries during the translation process. For instance, FIG. 11 illustrates ACL entries and the number of order-free ACLs. The x-axis in FIG. 11 represents ACL entries in their original order and the y axis refers to the number of spin-off order-free entries from the original one. It can be seen from FIG. 11 that both the 18th and 38th entries spin-off two order-free entries, while entries 53 through 60 yield an empty order-free entry, implying that the original entries are redundant.

Figure 12B:
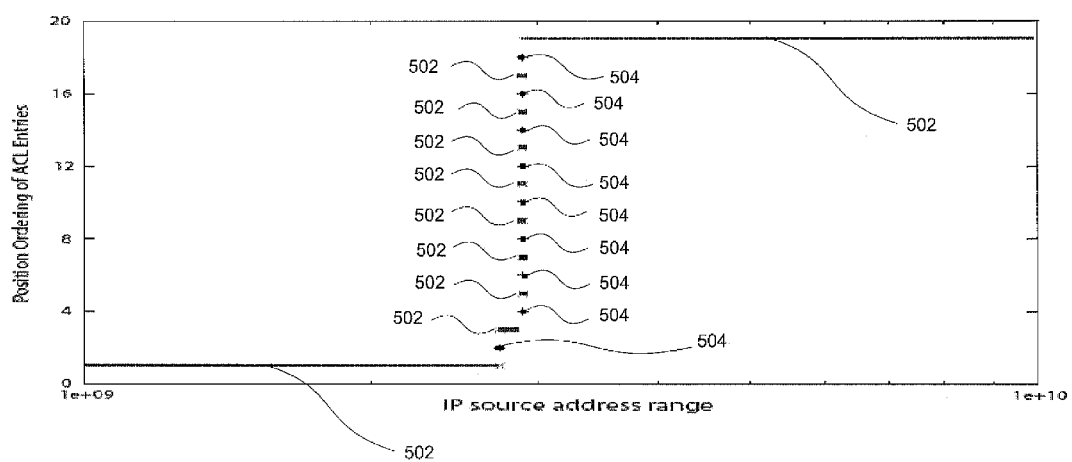

Next, an example of translating an existing order dependent ACL into its order-free equivalent is considered. FIGS. 12(a)-(b) plot the scope of each entry in the ACL for both order-dependent and order-free entries. FIG. 12(a) illustrates a plot 500 for the original ordering of ACL entries, while FIG. 12(b) illustrates a plot 500' for the position ordering of ACL entries. Items 502 in the figures refer to the deny action to be performed on the source IP address range and items 504 denote the permit action. The x-axis in both FIGS. 12(a) and 12(b) represents the source IP address range. The y-axis in FIG. 12(a) refers to the precedence ordering of 10 entries in the ACL. The y-axis in FIG. 12(b) represents the position ordering of 19 order-free entries.

It can be seen from the graph in FIG. 12(a) that the first nine entries in the ACL allow access a host with a specific IP address, which correspond to 9 distinct points 504 in the source IP address space. The last entry is an explicit deny any statement, which corresponds to a bar 502 covering the entire source IP address. The corresponding order-free ACL of FIG. 12(b) contains 19 entries, namely 9 distinct points 504, 8 small intervals 502 interlacing the consecutive points 504 and 2 long intervals 502 that cover both ends.

To better visualize, in the graph in FIG. 12(b), the interval 502 interlacing two consecutive points 504 is vertically placed between these points. It should be noted that by default there is an implicit deny at the end of every ACL.

Both explicit and implicit denies have the same effect on packet classification, but they differ in their semantic meaning. Such a subtle difference between an implicit deny and an explicit deny can be captured by the volume-based analysis set forth above. It follows from equations (27)-(28) that the positive volume of the ACL in the present example is 9 while the negative volume is 4,294,967,287. However, removing removing explicit deny entry at the end of the ACL list implies that the ACL list is terminated by an implicit deny entry, which corresponds to the zero negative volume.

Figure 13A:
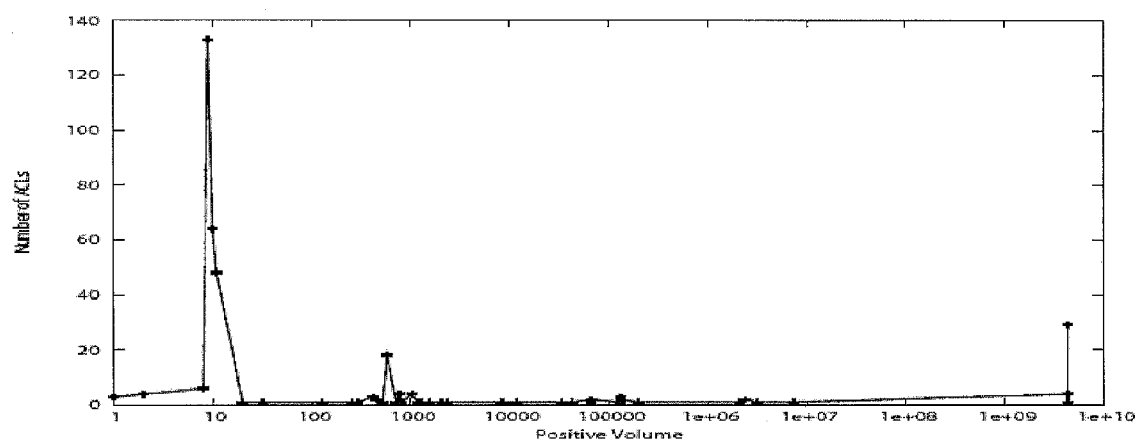
FIGS. 13(a)-(b) illustrate ACL volume distribution in accordance use with aspects of the present invention.
Figure 13B:
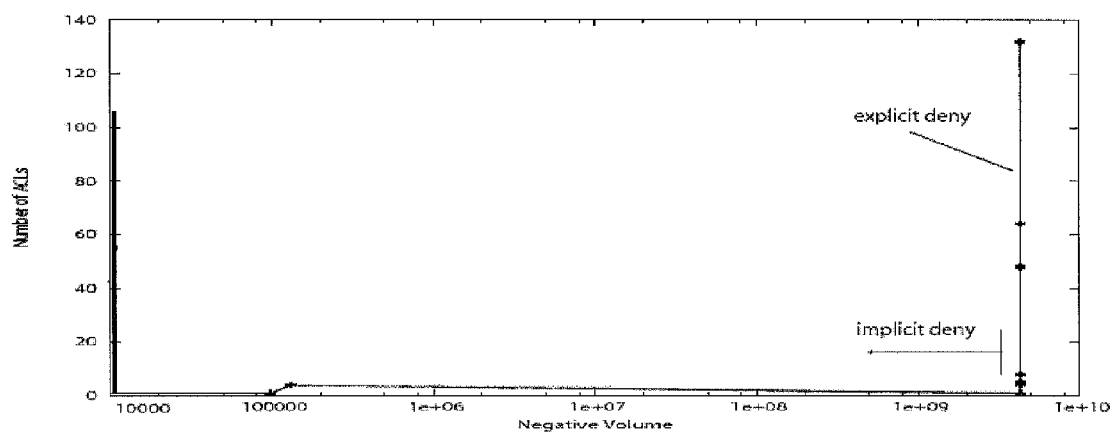

FIGS. 13(a) and (b) illustrate examples of ACL volume distribution. They are plotted with a log-scaled x-axis and show the positive/negative ACL volume distribution constructed from the 373 standard ACLs gathered from a large set of enterprise networks in the present example. FIG. 13(a) shows positive ACL volume and FIG. 13(b) shows negative ACL volume. It can be found that the positive volume distribution has two big peaks at around 10 and 4,294,967,296 in FIG. 13(a). This suggests that ACL entries involving a specific IP address are dominant in the total examined standard ACLs. The negative volume distribution graph of FIG. 13(b) has two peaks at 0 and around 4,294,967,287, which indicates that among the 373 standard ACLs in the example, 108 ACLs use an implicit deny and the remaining ACLs use an explicit deny at the end of ACLs.

In another example, 314 extended ACLs were Analysis showed that among the total of 314 extended ACLs, 33 of these ACLs contain redundant entries, which accounts for 10.5% of total examined ACLs, in sharp contrast to the 1.33% redundant ACLs in standard ACLs discussed above. Among extended ACLs with redundant entries, on average 7 out of 100 entries were redundant, as shown in the following table.

TABLE

| Statistics for Extended ACLs | | | |
|---|---|---|---|
| min | max | mean | standard deviation |
| Complexity of Extended ACLs | | | |
| 1 | 92.884 | 2.367 | 5.638 |
| Redundant entries | | | |
| 1 | 118 | 12.21 | 24.81 |
| Ratio of redundant size to input size | | | |
| 0.038 | 0.51 | 0.076 | 0.103 |

10.5% extended ACLs containing redundant entries

Figure 14:
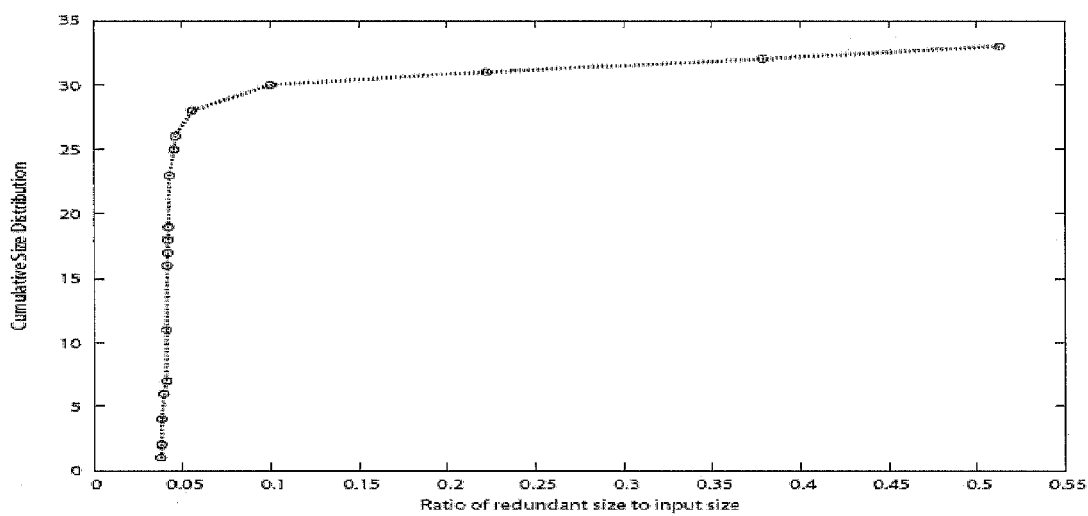
FIG. 14 illustrates the ratio of redundant size to input size of extended ACLs in accordance with aspects of the present invention.

FIG. 14 plots the cumulative distribution of the ratio of redundant size to input size of extended ACLs. The presence of excessive redundant extended ACLs may stem from the dimension-induced complexity in extended ACLs, which severely inhibits our ability to ensure the quality of ACLs and to avoid redundant entries during ACL editing.

The table above presenting statistics for extended ACLs shows that the average and maximum complexity of extended ACLs calculated over 314 examined ACLs is 2.367 and 92.88, respectively. In contrast, the average and maximum complexity of standard ACLs is 1.628 and 1.917. This is in line with the obtained theoretical results. When the dimension of an ACL is more than two, its complexity not only depends on its dimensionality but also depends on its size.

The dimension-induced complexity can be illustrated as follows. One extended ACL had a maximum complexity (92.88) out of the 314 extended ACLs. Aspects of the invention were used to determine that this ACL contained 230 entries, in which 118 entries were redundant. It yielded 10,403 order-free equivalent entries (basic building blocks).

Figure 15B:
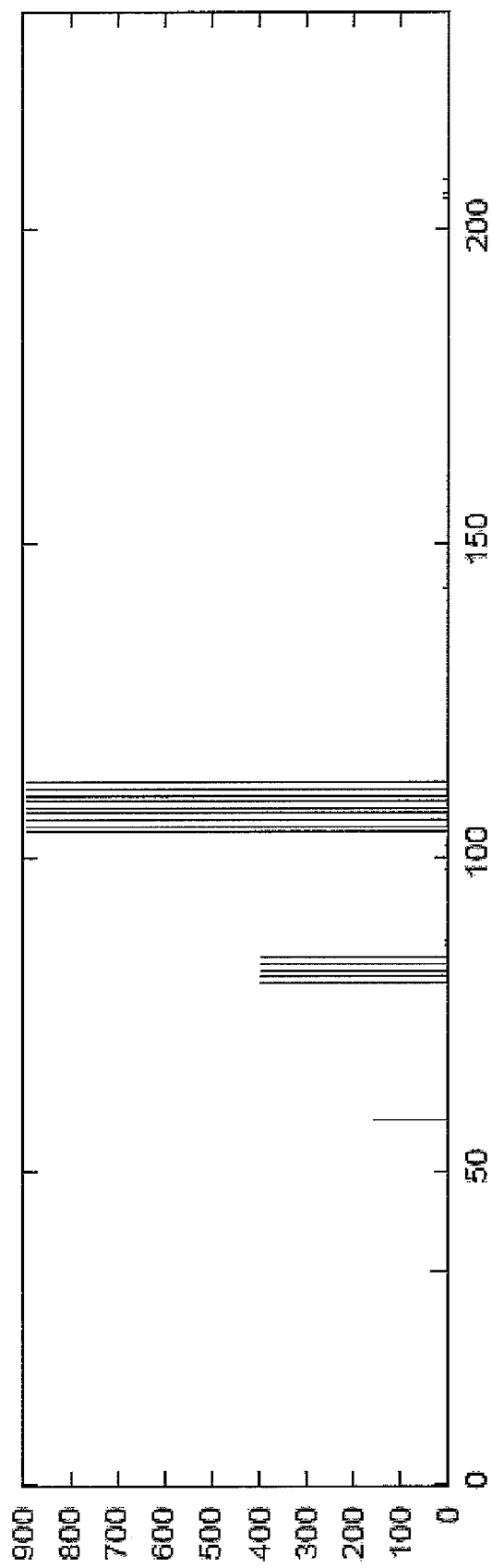

The spinoff entry distribution for this is constructed and plotted in FIGS. 15(a) and 15(b). As shown, the spinoff entry distribution exhibits a highly unevenly distributed pattern. There are up to 895 spinoff order-free entries for each entry 104-112 in the original order. Redundant entries appeared to be randomly distributed within the ACL. And the last 20 entries (from 210 to 230) are found to be redundant (the number of spinoffs is 0), while the first 34 entries turn out to be order-free (the number of spinoffs is one). For better visualization, the same data was plotted using two different y scales. The y scale used in the graph of FIG. 15(a) ranges from 0 to 10, while that used in the graph of FIG. 15(b) ranges from 0 to 900.

Figure 16:
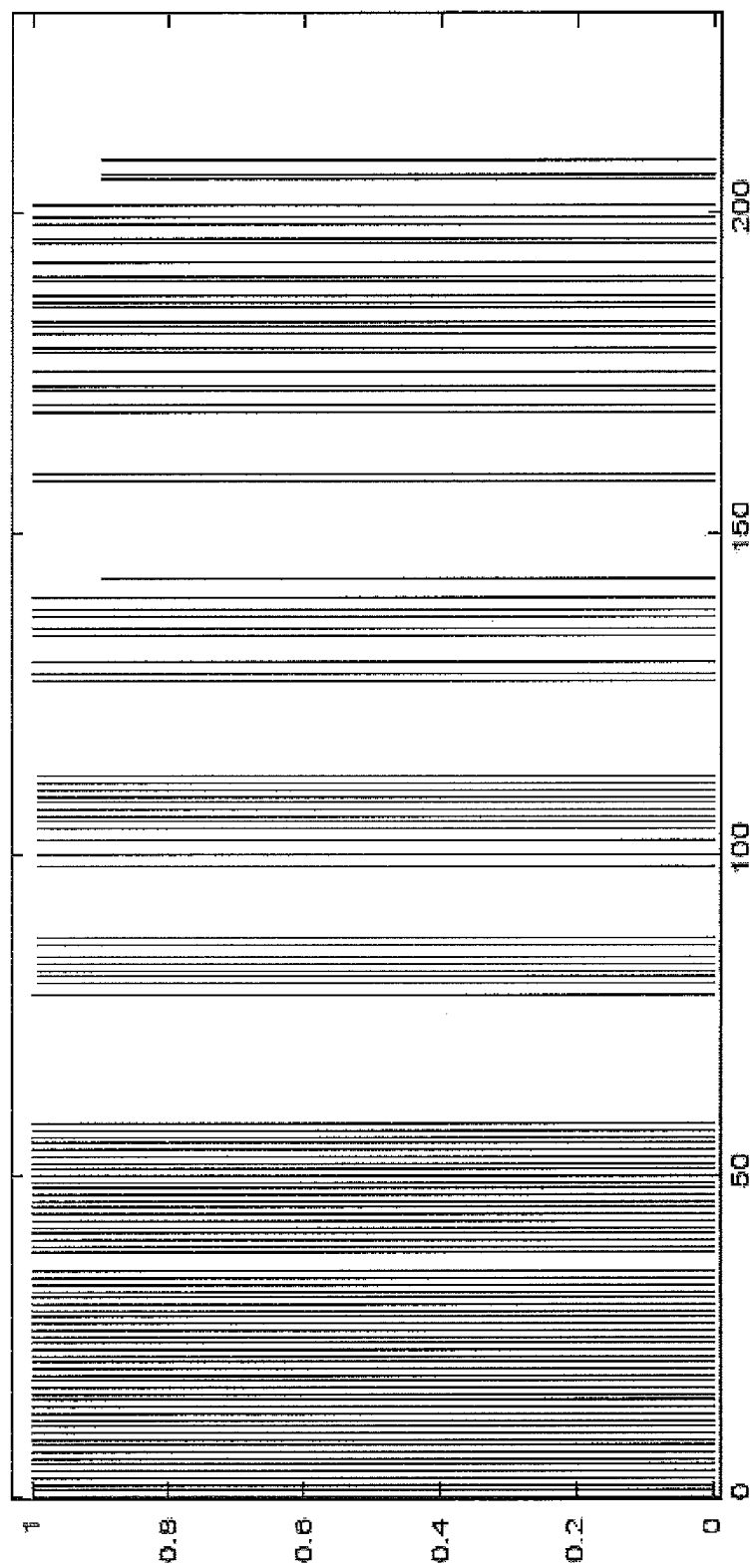
FIG. 16 illustrates order dependent (partial redundant) impact on ACL entries in accordance with aspects of the present invention.

FIG. 16 visualizes the order-dependent impact on each individual entry in the ACL in terms of the order-dependency induced volume contraction $D(A,a_i)$. $D(A,a_i)=1$ implies that $a_i$ is order-free, while $D(A,a_i)=0$ implies that $a_i$ is redundant. In accordance with aspects of the invention, it has been discovered that there indeed exist 119 redundant entries in this ACL as shown in FIG. 16.

An experimental study was performed to evaluate the ability of hash-based function to discern semantic change due to modification of ACLs, and to quantify the sensitivity to ACL change in terms of complexity metric. Complexity and volume-based hash values for the original ACL were used as the baseline for comparison. In each run each individual entry in the ACL was deleted and the extent of its impact in comparison to the baselines was quantified.

Figure 17:
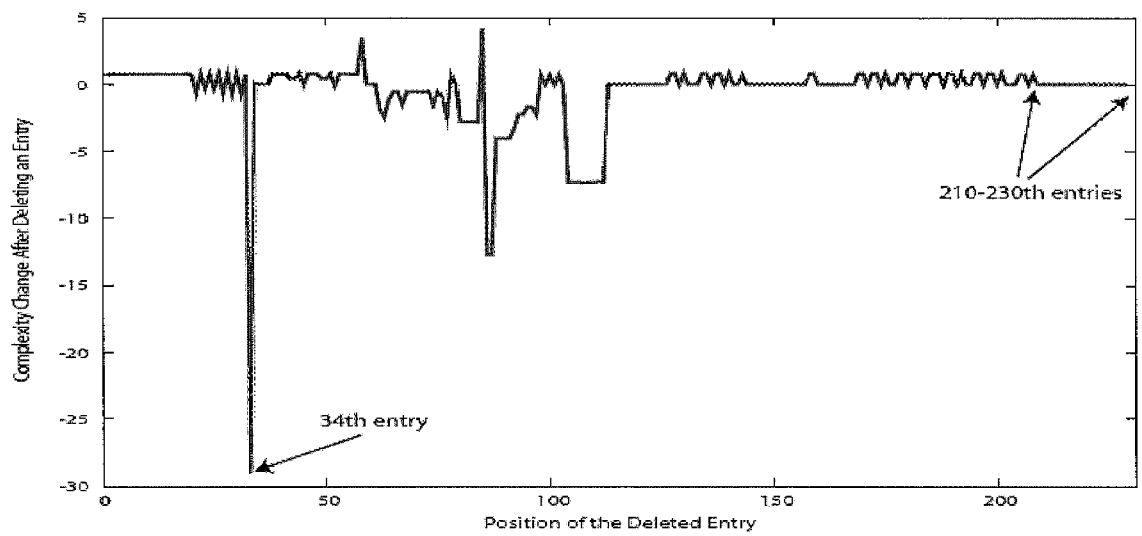
FIG. 17 illustrates complexity variation in accordance with aspects of the present invention.

FIG. 17 is a plot showing complexity variation. The x-axis in FIG. 17 represents the original position of an entry being deleted, the y-axis represents the complexity difference after deleting that entry (the complexity with the entry deleted minus the baseline complexity). Several observations can be made. First, deletion of a redundant entry has no impact on the complexity as well as hash value. This is because redundant entries do not contribute to ACL semantics (for example, FIG. 17, entry numbers 210-230). Second, removal of one individual entry may result in a rather big complexity change (for example, FIG. 17, entry number 34). Next, removal of one entry might either increase or decrease the semantic complexity in a pure random fashion. On average over all entries in this example, the complexity change due to one entry removal is reduced by −0.47937, as compared with the baseline complexity. Such complexity change is considered high variance (standard deviation is 2.824158). Furthermore, the volume-based hash function can capture any semantic change induced by removal of any non-redundant entry. Moreover, it can discern the semantic difference between the ith and jth non-redundant non-redundant entry deletion (i≠j).

Similar to complexity variation analysis, verification of the sensitivity of volume-based hash to semantic changes in ACL due to the deletion of an entry can be analyzed. Equation 32 below gives the difference in the positive volume based hash between the ACL with a deleted entry and the original ACL. Similarly, equation 33 gives the negative volume.

$$HD_p(A,A')=(H_p(A')-H_p(A)) \qquad (32)$$

$$HD_n(A,A')=(H_n(A')-H_n(A)) \qquad (32)$$

Figure 18A:
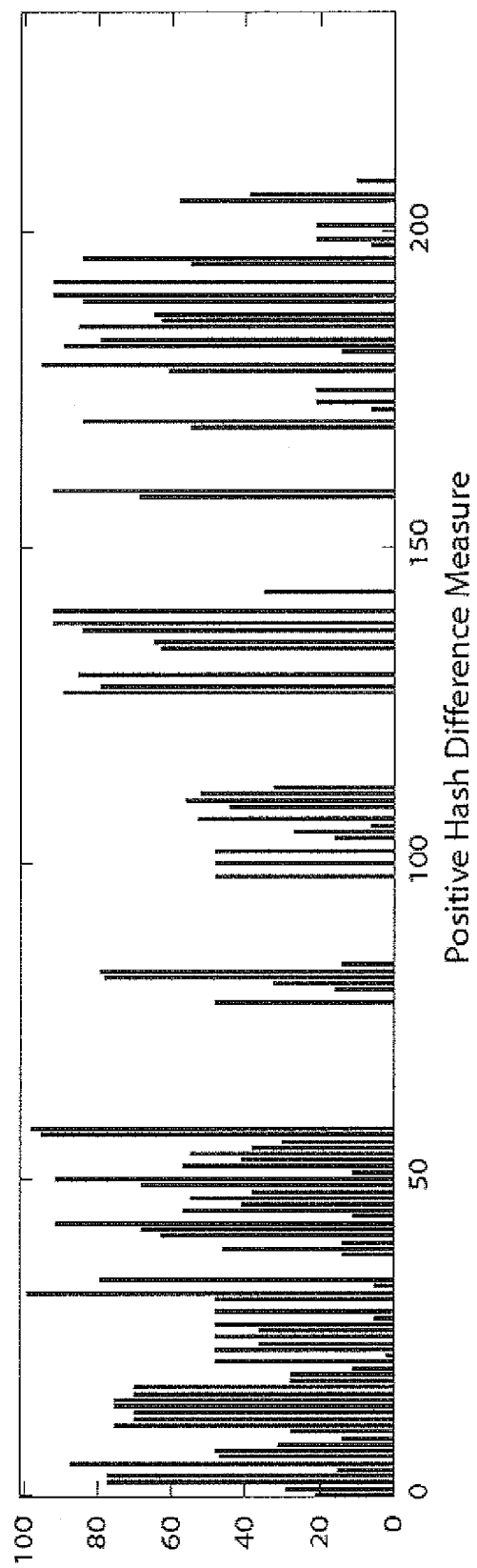
FIGS. 18(a)-(b) illustrate hash difference measures in accordance with aspects of the present invention.
Figure 18B:
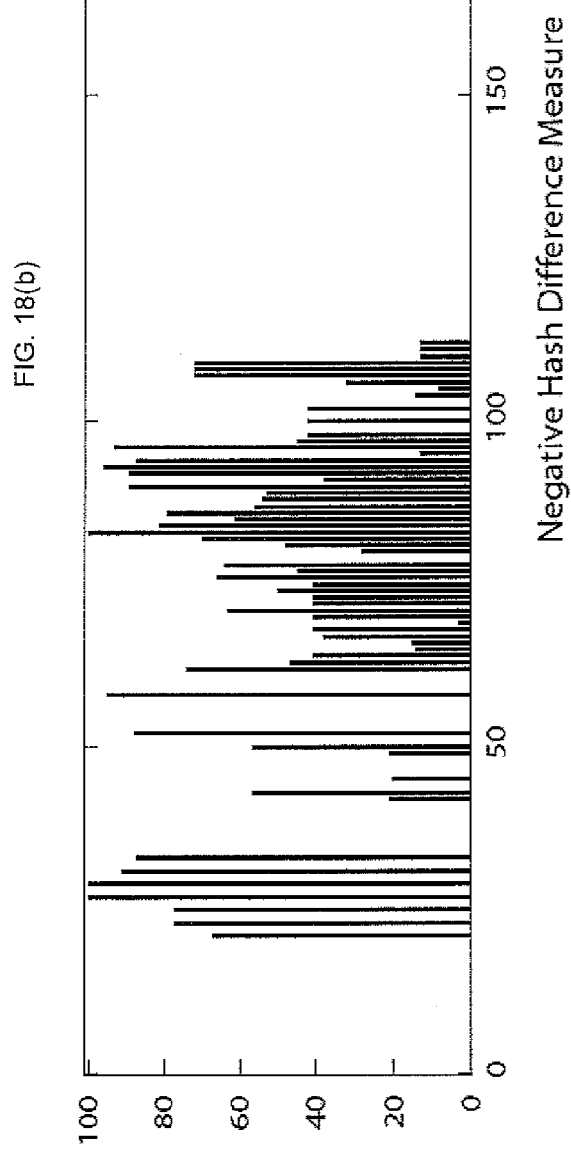
Figure 19:
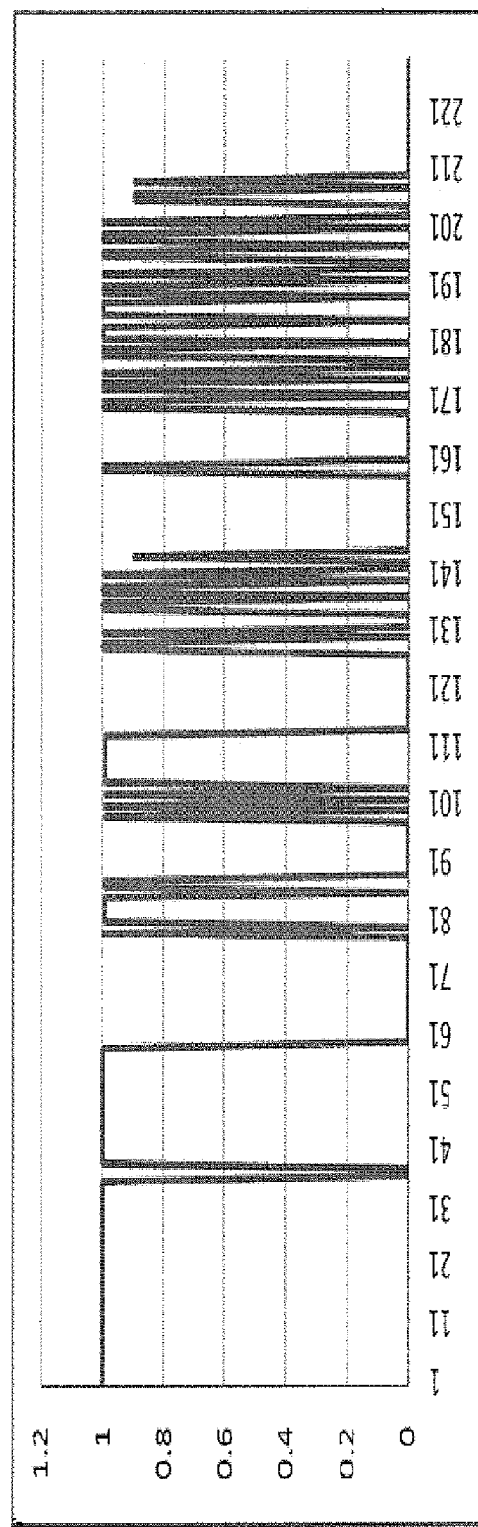
FIG. 19 illustrates a distribution of order-dependent impact on individual ACL entries in accordance with aspects of the present invention.

FIGS. 18(a) and 18(b) show that the values do not change when a redundant entry is deleted. However, the values do change for all non-redundant entry deletions. This validates the sensitivity of the volume based hash to semantics of an ACL. And FIG. 19 illustrates a distribution of order-dependent impact on individual ACL entries.

To see the effects of modification on ACLs, an extensive experimental study was conducted with three different perspectives, namely: reordering, deletion, and insertion. To quantify the effect of entry reordering, a random permutation was generated among entries and then the complexity of permutated ACL was calculated in comparison to the baseline value. The experiment for random deletion was conducted in a similar fashion.

The experiment study on insertion effect was performed via ACL synthesis. ACL A, which was used as base ACL, contains 230 entries with 118 redundant entries. The complexity of A was measured as 92.88, while ACL B, which is used as additive ACL, contains 256 entries with 97 redundant entries. The complexity of B was measured as 25.96.

In the experimental study, a certain percentage of entries was randomly taken from B and then randomly added into A. Complexity statistics under different permutation, deletion, and insertion rates are presented in the table below.

TABLE

Complexity Statistics Under Permutation, Deletion and Insertion Rates

|  | min | max | mean | std |
|---|---|---|---|---|
| Permutation percentage | | | | |
| 1% | 87.37 | 96.18 | 93.11 | 1.72 |
| 5% | 77.27 | 149.5 | 98.16 | 10.91 |
| 10% | 78.05 | 134.44 | 99.57 | 9.31 |
| 15% | 48.93 | 115.66 | 73.74 | 11.1 |
| Deletion percentage | | | | |
| 1% | 57.18 | 97.05 | 90.42 | 4.68 |
| 5% | 43.91 | 104.01 | 86.01 | 10.06 |
| 10% | 36.19 | 107.23 | 83.86 | 11.35 |
| 15% | 33.81 | 102.07 | 77.38 | 14.31 |
| Insertion percentage | | | | |
| 1% | 92.75 | 98.77 | 93.93 | 1.56 |
| 5% | 92.73 | 107.04 | 98.27 | 2.66 |
| 10% | 90.95 | 241.50 | 122.73 | 26.28 |
| 15% | 93.73 | 230.18 | 126.4 | 27.22 | base ACL: 230 entries, 118 redundant entries, complexity: 92.88
additive ACL: 256 entries, 97 redundant entries, complexity: 25.96

Each row in the above table was obtained via 200 independent runs. It is shown that generally an increased deletion rate results in a decreased ACL complexity (decreased mean complexity), while an increased insertion rate causes an increased ACL complexity. The complexity of ACLs does not appear very sensitive to permutation rate. Complexity variation (standard deviation) is shown to be correlated highly with deletion and insertion rates. This indicates that the extent of complexity fluctuation is accompanied with an increase of deletion and insertion rates.

The experimental study based on ACLs from an enterprise network indicates the presence of relatively high percentage of redundant entries. It also suggests that ACLs may be highly sensitive to change. Thus, deleting one entry at a particular position in an ACL may significantly alter its semantic meaning, as evidenced by a relative big change in complexity (see FIG. 17). This observation reinforces the need for an efficient process for evaluating the impact of addition addition of new ACL entries and removal of existing ones. It also indicates for an efficient means for automating redundancy detection and resolution. Aspects of the invention as presented herein address these issues.

Aspects of the invention may be implemented using a computer network such as shown in FIG. 1 or as shown in FIG. 20. As shown in FIG. 20, computer network 600 may include a client device 602, which may be a desktop or laptop computer, or may be another type of computing device such as a mobile phone, PDA or palmtop computer. The client device 602 may be interconnected via a local or direct connection and/or may be coupled via a communications network 604 such as a Local Area Network ("LAN"), Wide Area Network ("WAN"), the Internet, etc.

The client device 602 may couple to a server 606 via router 608. The server 606 is desirably associated with database 610, which may provide content to the client device 602 if access control list criteria are satisfied. The router 608 may include a firewall (not shown) and maintain an ACL therein.

Each device may include, for example, one or more hardware-based processing devices and may have user inputs such as a keyboard 612 and mouse 614 and/or various other types of input devices such as pen-inputs, joysticks, buttons, touch screens, etc. Display 616 may include, for instance, a CRT, LCD, plasma screen monitor, TV, projector, etc.

The user device 602, server 606 and router 608 may contain at least one processor, memory and other components typically present in a computer. As shown, the router 608 includes a processor 618 and memory 620. Components such as a transceiver, power supply and the like are not shown in any of the devices of FIG. 20.

Memory 620 stores information accessible by the processor 618, including instructions 622 that may be executed by the processor 618 and data 624 that may be retrieved, manipulated or stored by the processor. The firewall may be implemented by the router 608, where the ACL(s) is stored in memory 620. The memory 620 may be of any type capable of storing information accessible by the processor, such as a hard-drive, ROM, RAM, CD-ROM, flash memories, write-capable or read-only memories.

The processor 618 may comprise any number of well known processors, such as processors from Intel Corporation. Alternatively, the processor may be a dedicated controller for executing operations, such as an ASIC.

The instructions 622 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 624 may be retrieved, stored or modified by processor 618 in accordance with the instructions 622. The data may be stored as a collection of data. For instance, although the invention is not limited by any particular data structure, the data may be stored in computer registers, in a relational database as a table having a plurality of different fields and records. In one example, the memory 620 may include one or more stacks or queues for storing the data. In one example, the stacks/queues are configured as LIFOs.

The data may also be formatted in any computer readable format. Moreover, the data may include any information sufficient to identify the relevant information, such as descriptive text, proprietary codes, pointers, references to data stored in other memories (including other network locations) or information which is used by a function to calculate the relevant data.

Although the processor 618 and memory 620 are functionally illustrated in FIG. 20 as being within the same block, it will be understood that the processor and memory may actually comprise multiple processors and memories that may or may not be stored within the same physical housing or location. For example, some or all of the instructions and data may be stored on a removable CD-ROM or other recording medium and others within a read-only computer chip. Some or all of the instructions and data may be stored in a location physically remote from, yet still accessible by, the processor 618. Similarly, the processor 618 may actually comprise a collection of processors which may or may not operate in parallel. Data may be distributed and stored across multiple memories 620 such as hard drives or the like.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

While certain processes and operations have been shown in certain orders, it should be understood that they may be performed in different orders and/or in parallel with other operations unless expressly stated to the contrary.

The invention claimed is:

1. A method of handling redundant entries in an access control list usable in a computer network, the method comprising:
   obtaining an access control list and storing it in memory, the access control list including a plurality of entries;
   converting the plurality of entries from an order-dependent format into one or more order-free equivalents;
   storing the order-free equivalents in the memory;
   performing redundancy detection on the order-free equivalents to identify any redundant entries in the access control list;
   removing the redundant entries to create a modified access control list for use by a firewall of the computer network; and
   quantifying an extent of partial order dependence of each entry in the access control list, wherein performing the redundancy detection includes:
      determining a volume of a given one of the plurality of entries in the access control list;
      identifying a spinoff corresponding to the given entry;
      determining a volume of a selected order-free equivalent corresponding to the spinoff; and
      updating the volume of the corresponding given entry in the access control list using the volume of the selected order-free equivalent.

2. The method of claim 1, wherein performing the redundancy detection includes determining a degree of alteration for each access control list entry.

3. The method of claim 2, wherein determining the degree of alteration includes determining whether the spinoff is equal to zero, and if so, identifying the given entry as redundant.

4. The method of claim 2, wherein if the spinoff is not equal to zero, then updating the volume of the selected order-free equivalent corresponding to the spinoff.

5. The method of claim 1, wherein performing redundancy detection includes determining a scope contraction ratio for each access control list entry.

6. The method of claim 1, further comprising the firewall executing the modified access control list to permit or deny access to network resources in accordance with the entries of the modified access control list.

7. A method of handling redundant entries in an access control list usable in a computer network, the method comprising:
   obtaining an access control list and storing it in memory, the access control list including a plurality of entries;
   converting the plurality of entries from an order-dependent format into one or more order-free equivalents;
   storing the order-free equivalents in the memory;
   performing redundancy detection on the order-free equivalents to identify any redundant entries in the access control list;
   removing the redundant entries to create a modified access control list for use by a firewall of the computer network; and
   quantifying an extent of partial order dependence of each entry in the access control list, wherein performing redundancy detection on the order-free equivalents to identify any redundant entries comprises:

determining whether a selected entry produces any spinoff entries after translation to a corresponding order-free equivalent; and if no spinoff entries are produced, removing the selected entry from the access control list to form the modified access control list.

8. A computer-readable storage device having instructions stored thereon, the instructions, when executed by a processor, cause the processor to perform a method of handling redundant entries in an access control list usable in a computer network, the method comprising:

obtaining an access control list and storing it in memory, the access control list including a plurality of entries;

converting the plurality of entries from an order-dependent format into one or more order-free equivalents;

storing the order-free equivalents in the memory;

performing redundancy detection on the order-free equivalents to identify any redundant entries in the access control list;

removing the redundant entries to create a modified access control list for use by a firewall of the computer network; and quantifying an extent of partial order dependence of each entry in the access control list, wherein performing the redundancy detection includes:

determining a volume of a given one of the plurality of entries in the access control list;

identifying a spinoff corresponding to the given entry;

determining a volume of a selected order-free equivalent corresponding to the spinoff; and updating the volume of the corresponding given entry in the access control list using the volume of the selected order-free equivalent.

9. The computer-readable storage device of claim 8, wherein the converting comprises modifying the scope of an entry in the plurality of entries if the entry overlaps with another entry.

10. An apparatus for handling redundant entries in an access control list usable in a computer network, the apparatus comprising:

memory for storing information regarding an access control list, the access control list including a plurality of entries; and processor means for converting the plurality of entries from an order-dependent format into one or more order-free equivalents, storing the order-free equivalents in the memory, performing redundancy detection on the order-free equivalents to identify any redundant entries in the access control list, removing the redundant entries to create a modified access control list for use by a firewall of the computer network, and quantifying an extent of partial order dependence of each entry in the access control list, wherein the processor means performs the redundancy detection by further determining a scope contraction ratio for each access control list entry.

11. The apparatus of claim 10, wherein the processor means performs the redundancy detection by determining a volume of a given one of the plurality of entries in the access control list, identifying a spinoff corresponding to the given entry, determining a volume of a selected order-free equivalent corresponding to the spinoff, and updating the volume of the corresponding given entry in the access control list using the volume of the selected order-free equivalent.

12. The apparatus of claim 11, wherein the processor means performs the redundancy detection by further determining a degree of alteration for each access control list entry.

13. The apparatus of claim 12, wherein the processor means determines the degree of alteration by determining whether the spinoff is equal to zero, and if so, identifying the given entry as redundant.

14. The apparatus of claim 12, wherein if the spinoff is not equal to zero, then the processing means updates the volume of the selected order-free equivalent corresponding to the spinoff.

15. The apparatus of claim 10, wherein the processor means performs the redundancy detection on the order-free equivalents to identify any redundant entries by:

determining whether a selected entry produces any spinoff entries after translation to a corresponding order-free equivalent; and if no spinoff entries are produced, removing the selected entry from the access control list to form the modified access control list.

* * * * *